United States Patent
Levesque et al.

(10) Patent No.: US 12,534,827 B2
(45) Date of Patent: Jan. 27, 2026

(54) METHODS FOR POLYMORPHIC SCREENING

(71) Applicant: UNIVERSITÉ DE MONTRÉAL, Montréal (CA)

(72) Inventors: Alexandre Levesque, Montréal (CA); Thierry Maris, Montréal (CA); James Wuest, Outremont (CA)

(73) Assignee: UNIVERSITÉ DE MONTRÉAL, Montréal (CA)

( * ) Notice: Subject to any disclaimer, the term of this patent is extended or adjusted under 35 U.S.C. 154(b) by 860 days.

(21) Appl. No.: 17/793,730

(22) PCT Filed: Jan. 14, 2021

(86) PCT No.: PCT/CA2021/050034
§ 371 (c)(1),
(2) Date: Jul. 19, 2022

(87) PCT Pub. No.: WO2021/146796
PCT Pub. Date: Jul. 29, 2021

(65) Prior Publication Data
US 2023/0075935 A1 Mar. 9, 2023

Related U.S. Application Data

(60) Provisional application No. 62/963,798, filed on Jan. 21, 2020.

(51) Int. Cl.
| | | |
|---|---|---|
| *C40B 30/10* | (2006.01) | |
| *C30B 7/08* | (2006.01) | |
| *C30B 29/54* | (2006.01) | |
| *C30B 29/68* | (2006.01) | |

(52) U.S. Cl.
CPC ............... *C40B 30/10* (2013.01); *C30B 7/08* (2013.01); *C30B 29/54* (2013.01); *C30B 29/68* (2013.01)

(58) Field of Classification Search
CPC .......... C40B 30/10; C30B 7/08; C30B 29/54; C30B 29/68; G01N 2223/602; G01N 2223/62
See application file for complete search history.

(56) References Cited

U.S. PATENT DOCUMENTS

2008/0293596 A1   11/2008   Matzger

FOREIGN PATENT DOCUMENTS

WO   2003033462   4/2003

OTHER PUBLICATIONS

Zencirci, et al., "Crystallization of Metastable Polymorphs of Phenobarbital by Isomorphic Seeding", Cryst. Growth Des., 2009, 9, pp. 3444-3456.
Friscic, et al., "Engineering cocrystal and polymorph architecture via pseudoseeding", Chem. Commun., 2009, pp. 773-775.
Quai, et al., "5-Hydroxy-2H-pyrrol-2-ones and not 2-aminofurans are the cycloaddition products between alkyl isocyanides and benzyliden-1,3-diketones", Tetrahedron Letters, 2004, 45, pp. 1413-1416.
Matsuda, et al., "Studies of Heterocyclic Enaminonitriles. VI. Synthesis of 2-Amino-3-cyano-4,5-dihydrofurans", Chem Pharm Bull, 1985, 33(3), pp. 937-943.
Weissbuch, et al., "Tailor-Made" and Charge-Transfer Auxiliaries for the Control of the Crystal Polymorphism of Glycine, Ad Mater, 1994, 6(12), pp. 952-956.
Spaggiari, et al., "Low-Temperature Deacylation of N-Monosubstituted Amides", Org. Lett. 2004, 6, pp. 3885-3888.
Yamanaka, et al., "Studies on β-Lactam Antibiotics. IX. Synthesis and Biological Activity of a New Orally Active Cephalosporin, Cefixime (FK027)", J. Antibiot., 1985, 38, pp. 1738-1751.
Bakavoli, et al., "One-pot synthesis of substituted 2-amino-3-furonitriles", J. Chem. Res., 2008, pp. 564-565.
Jun, "Regioselective Synthesis of 2-Amino-3-cyanofuran Derivatives and Its Guanidine Cyclization Reaction", Bull. Korean Chem. Soc., 1996, 17, pp. 676-678.
Li, et al., "Synthesis, Conformational Polymorphism, and Construction of a G-T Diagram of 2-[(2-Nitrophenyl)amino]-3-thiophenecarbonitrile", Cryst. Growth Des., 2006, 6, pp. 2469-2474.
He, et al., "Conformational Color Polymorphism and Control of Crystallization of 5-Methyl-2-[(4-methyl-2-nitrophenyl) amino]-3-thiophenecarbonitrile", J. Pharm. Sci., 2001, 90, pp. 371-388.
Uzoh, et al., "Is the Fenamate Group a Polymorphophore? Contrasting the Crystal Energy Landscapes of Fenamic and Tolfenamic Acids", Cryst. Growth Des., 2012, 12, pp. 4230-4239.
Lutker, et al., "Investigation of a Privileged Polymorphic Motif: A Dimeric ROY Derivative", Cryst. Growth Des., 2008, 8, pp. 136-139.
Heskia, et al., "Foiling Normal Patterns of Crystallization by Design. Polymorphism of Phosphangulene Chalcogenides", Cryst. Growth Des., 2019, 19, pp. 5390-5406.
Cherukuvada, et al., "Eutectics as improved pharmaceutical materials: design, properties and characterization", Chem. Commun., 2014, 50, pp. 906-923.
Kitaigorodsky, A. I. Mixed Crystals; Springer-Verlag: Berlin, 1984.
Bruni, "Solid Solutions", Chem. Rev., 1, pp. 345-375, 1925.
Lusi, "Engineering Crystal Properties through Solid Solutions", Cryst. Growth Des., 2018, 18, pp. 3704-3712.
Cruz-Cabez, et al., "Cocrystals Help Break the "Rules" of Isostructurality: Solid Solutions and Polymorphism in the Malic/Tartaric Acid System", Cryst. Growth Des., 2018, 18, pp. 855-863.
Romasanta, et al., "How similar is similar? Exploring the binary and ternary solid solution landscapes of p-methyl/chloro/bromo-benzyl alcohols", CrystEngComm, 2017, 19, pp. 653-660.
Schur, et al., "Kitaigorodsky Revisited: Polymorphism and Mixed Crystals of Acridine/Phenazine", Chem. Eur. J. 2015, 21, pp. 1735-1742.

(Continued)

*Primary Examiner* — Jeremy C Flinders
(74) *Attorney, Agent, or Firm* — Hovey Williams LLP; Crissa A. Cook

(57) ABSTRACT

A method for screening a target compound for polymorphic forms is provided. The method comprises providing a library of mixed-crystal seeds, each mixed-crystal seed consisting essentially of the target compound and at least one structural analog that is structurally analogous to the target compound; and for each mixed-crystal seed: introducing the mixed-crystal seed into a crystallization medium comprising the target compound, under conditions suitable for crystallization of the target compound; monitoring the formation of crystals of the target compound; and when formed, characterizing the crystals of the target compound.

20 Claims, 3 Drawing Sheets

(56) References Cited

OTHER PUBLICATIONS

Lusi, et al., "Expanding the Scope of Molecular Mixed Crystals Enabled by Three Component Solid Solutions", Cryst. Growth Des., 2015, 15, pp. 4098-4103.
Braga, et al., "Hetero-Seeding and Solid Mixture to Obtain New Crystalline Forms", Chem. Eur. J., 2009, 15, pp. 1508-1515.
Oliveira, et al., "Continuously Substituted Solid Solutions of Organic Co-Crystals", Cryst. Growth Des., 2008, 8, pp. 4487-4493.
Myasnikova, R. M, "Lattice Distortions in Organic Solid Solutions", Mol. Cryst. Liq. Cryst., 1982, 90, pp. 195-204.
Cartner, et al., "Volume-Modulated Frequency Changes in the Raman Spectra of Mixed Hexacarbonyl Crystals, $MxM'1-x(CO)6$, M, M'=Cr, Mo", W. J. Chem. Soc., Faraday Trans., 1982, 2(78), pp. 369-377.
Gao, et al., "[11C]Olanzapine, radiosynthesis and lipophilicity of a new potential PET 5-HT2 and D2 receptor radioligand", Bioorg. Med. Chem. Lett., 2013, 23, pp. 1953-1956.
Raza, et al., "Rapid Continuous Antisolvent Crystallization of Multicomponent Systems", Cryst. Growth Des., 2018, 18, pp. 210-218.
Lestari, et al., "A mixed molecular salt of lithium and sodium breaks the Hume-Rothery rules for solid solutions", Chem. Commun., 2019, 55, pp. 2297-2300.
Delori, et al., "Drug solid solutions—a method for tuning phase transformations", CrystEngComm, 2014, 16, pp. 5827-5831.
Bredikhin, et al., "Chiral drug timolol maleate as a continuous solid solution: Thermochemical and single crystal X-ray evidence", CrystEngComm, 2012, 14, pp. 648-655.
Ganduri, et al., "Manifestation of cocrystals and eutectics among structurally related molecules: towards understanding the factors that control their formation", CrystEngComm, 2017, 19, pp. 1123-1132.
Chakraborty, et al., "C—H • • • F Hydrogen Bonds in Solid Solutions of Benzoic Acid and 4 Fluorobenzoic acid", Cryst. Growth Des., 2018, 18, pp. 3607-3615.
Braun, et al., "Prediction and experimental validation of solid solutions and isopolymorphs of cytosine/5-flucytosine", CrystEngComm, 2017, 19, pp. 3566-3572.
Braun, et al., "Experimental and Computational Hydrate Screening: Cytosine, 5 Flucytosine, and Their Solid Solution", Cryst. Growth Des., 2017, 17, pp. 4347-4364.
Huang, et al., "Discovery of a Solid Solution of Enantiomers in a Racemate-Forming System by Seeding", J. Am. Chem. Soc., 2006, 128, pp. 11985-11992.
Lusi, "A rough guide to molecular solid solutions: design, synthesis and characterization of mixed crystals", CrystEngComm, 2018, 20, pp. 7042-7052.
Shi, et al., "Geometric isotope effect of deuteration in a hydrogen-bonded host-guest crystal", Nat. Commun., 2018, 9, pp. 481-489.
Merz, et al., "Deuterium Perturbs the Molecular Arrangement in the Solid State", Cryst. Growth Des., 2015, 15, pp. 1553-1558.
Crawford, et al., "Isotopic Polymorphism in Pyridine", Angew. Chem. Int. Ed., 2009, 48, pp. 755-757.
Zhou, et al., "Isotopomeric Polymorphism", J. Am. Chem. Soc., 2004, 126, pp. 8392-8393.
International Preliminary Report on Patenability in corresponding PCT/CA2021/050034, dated Jul. 26, 2022.
Price, et al., "Crystalline Polymorph Selection and Discovery with Polymer Heteronuclei", J. Am. Chem. Soc. 2005, 127, pp. 5512-5517.
Levesque, et al., "ROY Reclaims Its Crown: New Ways to Increase Polymorphic Diversity", J. Am. Chem. Soc., 2020, 142, pp. 11873-11883.
Bioisosteres in Medicinal Chemistry, First Edition, 2012, Wiley, Chapter 2.
Bernstein, J. Polymorphism in Molecular Crystals; Oxford University Press: New York, 2002.
Nyman, et al., "Static and lattice vibrational energy differences between polymorphs", CrystEngComm, 2015, 17, pp. 5154-5165.
Price, "Control and prediction of the organic solid state: a challenge to theory and experiment", Proc. R. Soc., 2018, 474, 16 pages.
Price, "Predicting crystal structures of organic compounds", Chem. Soc. Rev., 2014, 43, pp. 2098-2111.
Thakur, et al., "Crystal Structure and Prediction", Annu. Rev. Phys. Chem., 2015, 66, pp. 21-42.
McCrone, et al., "Polymorphism in Physics and Chemistry of the Organic Solid State", Interscience, 1965, II, pp. 725-767.
Kersten, et al., "Survey and analysis of crystal polymorphism in organic structures", IUCrJ, 2018, 5, pp. 124-129.
Cruz-Cabeza, et al., "Facts and fictions about polymorphism", Chem. Soc. Rev., 2015, 44, pp. 8619-8635.
Lopez-Mejias, et al., "Nonamorphism in Flufenamic Acid and a New Record for a Polymorphic Compound with Solved Structures", J. Am. Chem. Soc., 2012, 134, pp. 9872-9875.
Funnell, et al., "Structural behaviour of OP-ROY at extreme conditions", CrystEngComm, 2019, 21, pp. 4473-4483.
Nyman, "Accuracy and Reproducibility in Crystal Structure Prediction: The Curious Case of ROY", CrystEngComm, 21, pp. 2080-2088 (2019).
Ziemecka, et al., "Polymorph Selection of ROY by Flow-Driven Crystallization", Crystals, 2019, 9, p. 351.
Gushurst et al., "The PO13 Crystal Structure of ROY", CrystEngComm, 21, pp. 1363-1368, 2019.
Tan, et al., "ROY revisited, again: the eighth solved structure", Faraday Discuss., 2018, 211, pp. 477-491.
Thomas, et al., "The Polymorphs of ROY: A Computational Study of Lattice Energies and Conformational Energy Differences", Aust. J. Chem., 2018, 71, pp. 279-284.
Habgood, et al., "Efficient Handling of Molecular Flexibility in Ab Initio Generation of Crystal Structures", J. Chem. Theory Comput., 2015, 11, pp. 1957-1969.
Gnutzmann, et al., "Solvent-Triggered Crystallization of Polymorphs Studied in Situ", Cryst. Growth Des . . . 2014, 14, pp. 6445-6450.
Vasileiadis, et al., "The polymorphs of ROY: application of a systematic crystal structure prediction technique", Acta Cryst., 2012, B68, pp. 677-685.
Yu, "Polymorphism in Molecular Solids: An Extraordinary System of Red, Orange, and Yellow Crystals", Acc. Chem. Res., 2010, 43, pp. 1257-1266.
Li, et al., "Crystallization Force—A Density Functional Theory Concept for Revealing Intermolecular Interactions and Molecular Packing in Organic Crystals", Chem. Eur. J., 2009, 15, pp. 361-371.
Singh, et al., "Concomitant Crystallization of ROY on Patterned Substrates: Using a High Throughput Method to Improve the Chances of Crystallization of Different Polymorphs", Cryst. Growth Des., 2009, 9, pp. 1182-1185.
McKinnon, et al., "Comparison of Polymorphic Molecular Crystal Structures through Hirshfeld Surface Analysis", Cryst. Growth Des. 2007, 7, pp. 755-769.
Chen, et al., "Cross-Nucleation between ROY Polymorphs", J. Am. Chem. Soc., 2005, 127, pp. 17439-17444.
Chen, et al., "New Polymorphs of ROY and New Record for Coexisting Polymorphs of Solved Structures", J. Am. Chem. Soc., 2005, 127, pp. 9881-9885.
Dunitz, et al., "Toward a Quantitative Description of Crystal Packing in Terms of Molecular Pairs: Application to the Hexamorphic Crystal System, 5-Methyl-2-[(2-nitrophenyl)amino]-3-thiophenecarbonitrile", Cryst. Growth Des., 2005, 5, pp. 2180-2189.
Hilden, et al., "Capillary Precipitation of a Highly Polymorphic Organic Compound", Cryst. Growth Des., 2003, 3, pp. 921-926.
Yu, "Color Changes Caused by Conformational Polymorphism: Optical-Crystallography, Single-Crystal Spectroscopy, and Computational Chemistry", J. Phys. Chem. A, 2002, 106, pp. 544-550.
Yu, et al., "Thermochemistry and Conformational Polymorphism of a Hexamorphic Crystal System", J. Am. Chem. Soc., 2000, 122, pp. 585-591.
Borchardt, T. B. Ph. D. Thesis, Purdue University, West Lafayette, IN, 1997.

(56) References Cited

OTHER PUBLICATIONS

Bhardwaj, et al., "A Prolific Solvate Former, Galunisertib, under the Pressure of Crystal Structure Prediction, Produces Ten Diverse Polymorphs", J. Am. Chem. Soc., 2019, 141, pp. 13887-13897.

Zeidan, et al., "An Unprecedented Case of Dodecamorphism: The Twelfth Polymorph of Aripiprazole Formed by Seeding with its Active Metabolite", CrystEngComm, 2016, 18, pp. 1486-1488.

Crystallization: Basic Concepts and Industrial Applications; Beckmann, W., Ed.; Wiley-VCH Verlag: Weinheim, 2013.

Tung, et al., "Crystallization of Organic Compounds: An Industrial Perspective", John Wiley & Sons, 2009.

Mullin, J. W. Crystallization; Butterworth-Heinemann, Oxford, 2001.

Davey, et al., "Nucleation of Organic Crystals—A Molecular Perspective", Angew. Chem. Int. Ed., 2013, 52, pp. 2166-2179.

Erdemir, et al., "Nucleation of Crystals from Solution: Classical and Two-Step Models", Acc. Chem. Res., 2009, 42, pp. 621-629.

Vekilov, "Nucleation", Cryst. Growth Des., 2010, 10, pp. 5007-5019.

Pfund, et al., "Towards Exhaustive and Automated High-Throughput Screening for Crystalline Polymorphs", ACS Comb. Sci., 2014, 16, pp. 309-313.

Olmsted, et al., "The role of chemical interactions and epitaxy during nucleation of organic crystals on crystalline substrates", CrystEngComm, 2011, 13, pp. 1070-1073.

Chadwick, et al., "Polymorphic control by heterogeneous nucleation—A new method for selecting crystalline substrates", CrystEngComm, 2011, 13, pp. 6625-6627.

Lang, et al., "The Use of Polymer Heteronuclei for Crystalline Polymorph Selection", J. Am. Chem. Soc., 2002, 124, pp. 14834-14835.

Mitchell, et al., "Selective Nucleation and Discovery of Organic Polymorphs through Epitaxy with Single Crystal Substrates", J. Am. Chem. Soc., 2001, 123, pp. 10830-10839.

Islam, et al., "A hetero-micro-seeding strategy for readily crystallizing closely related protein variants", Biochem. Biophys. Res. Commun., 2017, 493, pp. 504-508.

Abuhammad, et al., "To Cross-Seed or Not to Cross-Seed": A Pilot Study Using Metallo-B-lactamases, Cryst. Growth Des., 2017, 17, pp. 913-924.

Srirambhatla, et al., "Isomorphous template induced crystallisation: a robust method for the targeted crystallisation of computationally predicted metastable polymorphs", Chem. Commun., 2016, 52, pp. 7384-7386.

Bucar, et al., "The curious case of (caffeine) (benzoic acid): how heteronuclear seeding allowed the formation of an elusive cocrystal", Chem. Sci., 2013, 4, pp. 4417-4425.

METHODS FOR POLYMORPHIC SCREENING

CROSS-REFERENCE TO RELATED APPLICATIONS

This application is the U.S. National Stage of International Patent Application No. PCT/CA2021/050034, filed Jan. 14, 2021, which is hereby incorporated by reference in its entirety, and which claims priority to U.S. Provisional Patent Application No. 62/963,798, filed Jan. 21, 2020.

TECHNICAL FIELD

The technical field generally relates to methods of crystallization of chemical compounds, and more particularly relates to methods for polymorphic screening using mixed-crystal seeding.

BACKGROUND

Polymorphism refers to the ability of a solid substance to exist in more than one crystalline form. Polymorphism has been known for centuries but remains poorly understood. The phenomenon has great practical importance, because polymorphs can differ in solubility, melting point, density, color, and other basic properties. As a result, controlling polymorphism is a central preoccupation in all fields where solid materials are used. For example, different solid forms with varying solubility are sought to adjust the bioavailability of drugs, foodstuffs, and agrochemicals. Polymorphs of pigments can vary usefully in color, and forms of explosive solids can be selected to resist inadvertent detonation. In many fields, crystallizations of compounds of interest are examined exhaustively to uncover the widest possible range of forms. When a previously unknown polymorph is discovered, it can be patented as a new form of matter. For at least these reasons, polymorphism is a subject of vital importance in science and technology, and significant resources are deployed in the search for new crystalline forms and new methods for polymorphic screening. Many challenges still exist in the field of polymorphic screening.

SUMMARY

In a first aspect, a method for screening a target compound for polymorphic forms is provided. The method comprises:
providing a library of mixed-crystal seeds, each mixed-crystal seed consisting essentially of the target compound and at least one structural analog that is structurally analogous to the target compound; and
for each mixed-crystal seed:
introducing the mixed-crystal seed into a crystallization medium comprising the target compound, under conditions suitable for crystallization of the target compound;
monitoring the formation of crystals of the target compound; and
when formed, characterizing the crystals of the target compound.

In some embodiments, the at least one structural analog is one structural analog.

In some embodiments, the library of mixed-crystal seeds is prepared by varying at least one of a chemical structure of the at least one structural analog and a molar ratio of the target compound and the at least one structural analog.

In some embodiments, each mixed-crystal seed comprises the target compound and the at least one structural analog in a molar ratio varying between 95:5 and 5:95.

In some embodiments, each mixed-crystal seed comprises the target compound and the at least one structural analog in a molar ratio between 75:25 and 25:75.

In some embodiments, each one of the at least one structural analog is one of an isostere of the target compound, an isomer of the target compound, a quasi-isostere of the target compound, an isomer of an isostere of the target compound, and an isomer of a quasi-isostere of the target compound.

In some embodiments, the isomer of the target compound is a constitutional isomer of the target compound, an enantiomer of the target compound, a diastereoisomer of the target compound, or an isotopic isomer of the target compound; the isomer of the isostere of the target compound is a constitutional isomer of the isostere of the target compound, an enantiomer of the isostere of the target compound, a diastereoisomer of the isostere of the target compound, or an isotopic isomer of the isostere of the target compound; and the isomer of the quasi-isostere of the target compound is a constitutional isomer of the quasi-isostere of the target compound, an enantiomer of the quasi-isostere of the target compound, a diastereoisomer of the quasi-isostere of the target compound, or an isotopic isomer of the quasi-isostere of the target compound.

In some embodiments, the crystallization medium comprises a solution of the target compound in a solvent.

In some embodiments, the crystallization medium comprises a solid or a mixture of solids.

In some embodiments, crystallization of the target compound is performed by at least one of grinding and sublimation.

In some embodiments, the crystallization medium comprises a melt of the target compound.

In some embodiments, the crystallization medium comprises a mixture comprising a melt of the target compound suspended in a liquid.

In some embodiments, monitoring the formation of crystals of the target compound comprises monitoring the formation of single crystals of the target compound suitable for single-crystal X-ray diffraction.

In some embodiments, characterizing the crystals of the target compound is performed by at least one of powder X-ray diffraction (PXRD), single-crystal X-ray diffraction (SC-XRD), thermogravimetric analysis (TGA), differential scanning calorimetry (DSC), Raman spectroscopy, and infrared spectroscopy.

In another aspect, a method for crystallizing a target compound is provided. The method comprises providing a mixed-crystal seed consisting essentially of the target compound and at least one structural analog that is structurally analogous to the target compound; and introducing the mixed crystal seed into a crystallization medium comprising the target compound, to obtain crystals of the target compound.

In some embodiments, the at least one structural analog is one structural analog.

In some embodiments, the mixed-crystal seed comprises the target compound and the at least one structural analog in a molar ratio varying between 95:5 and 5:95.

In some embodiments, the mixed-crystal seed comprises the target compound and the at least one structural analog in a molar ratio between 75:25 and 25:75.

In some embodiments, each one of the at least one structural analog is one of an isostere of the target compound, an isomer of the target compound, a quasi-isostere of the target compound, an isomer of an isostere of the target compound, and an isomer of a quasi-isostere of the target compound.

In some embodiments, the isomer of the target compound is a constitutional isomer of the target compound, an enantiomer of the target compound, a diastereoisomer of the target compound, or an isotopic isomer of the target compound; the isomer of the isostere of the target compound is a constitutional isomer of the isostere of the target compound, an enantiomer of the isostere of the target compound, a diastereoisomer of the isostere of the target compound, or an isotopic isomer of the isostere of the target compound; and the isomer of the quasi-isostere of the target compound is a constitutional isomer of the quasi-isostere of the target compound, an enantiomer of the quasi-isostere of the target compound, a diastereoisomer of the quasi-isostere of the target compound, or an isotopic isomer of the quasi-isostere of the target compound.

In some embodiments, the crystallization medium comprises a solution of the target compound in a solvent.

In some embodiments, the crystallization medium comprises a solid or a mixture of solids.

In some embodiments, crystallization of the target compound is performed by at least one of grinding and sublimation.

In some embodiments, the crystallization medium comprises a melt of the target compound.

In some embodiments, the crystallization medium comprises a mixture comprising a melt of the target compound suspended in a liquid.

In some embodiments, the method further comprises monitoring the formation of single crystals of the target compound suitable for single-crystal X-ray diffraction.

In some embodiments, the method further comprises characterizing the crystals of the target compound.

In some embodiments, characterizing the crystals of the target compound is performed by at least one of powder X-ray diffraction (PXRD), single-crystal X-ray diffraction (SC-XRD), thermogravimetric analysis (TGA), differential scanning calorimetry (DSC), Raman spectroscopy, and infrared spectroscopy.

In some embodiments, the target compound is in the form of a neutral molecule, a compound in the form of a salt of a neutral compound, a compound in the form of a solvate of a neutral compound or a salt, or a compound in the form of a cocrystal of a neutral compound or a salt.

DETAILED DESCRIPTION

Introduction

Figure 1:
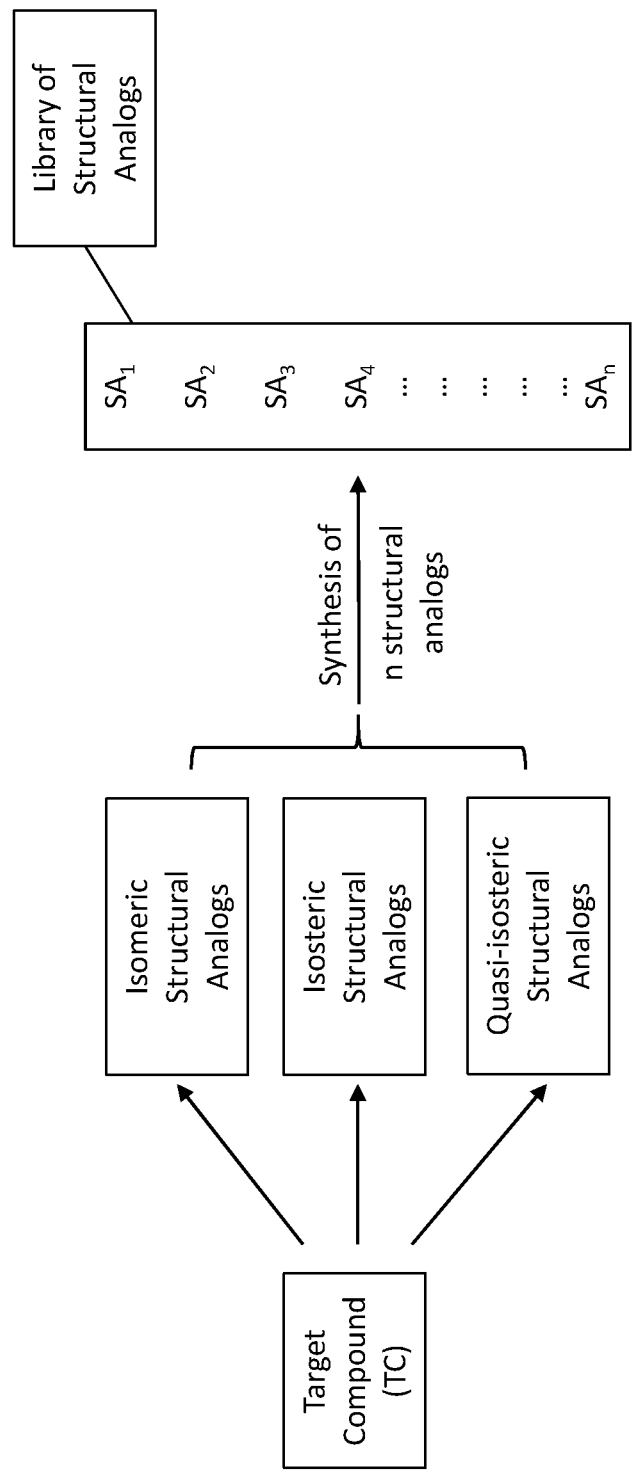
FIG. 1 is a schematic diagram showing how a library of structural analogs can be generated.

In principle, even simple compounds can crystallize in an infinite number of ways, differing in details such as the conformations of individual molecules and their arrangement in space relative to neighbors. Potential polymorphs will have different free energies, but one form will be thermodynamically most stable under particular defined conditions. Polymorphs that can be isolated and characterized are usually found to vary little in energy, typically ≤1-2 kcal/mol, and potential polymorphs that fall well outside this range become virtually inaccessible. In this way, the infinite number of theoretical possibilities is reduced to a finite set of realistic options.

Increasingly, knowledge of polymorphism derived from empirical studies is being augmented by insights that come from using computational methods to predict how compounds will crystallize. Computational approaches are increasingly powerful, but they are still impractical or unreliable for predicting structures when the constituents are large, have many degrees of conformational freedom, or pack to form structures with multiple molecules in the unit cell or asymmetric unit. When dependable computational analyses are feasible, however, they typically confirm that numerous polymorphs lie within a few kcal/mol of the most stable form. This is consistent with the conjecture of McCrone, who famously opined " . . . that every compound has different polymorphic forms and that, in general, the number of forms known for a given compound is proportional to the time and energy spent in research on that compound."

Nevertheless, many compounds have been crystallized under diverse conditions, yet only one form has been observed so far. Moreover, analysis of the Cambridge Structural Database (CSD), which is the world's largest collection of reported structures of organic/organometallic substances and now includes more than one million entries, shows that only about 37% of molecular compounds are known to be polymorphic. A recent analysis of the database identified merely 13 compounds (0.0013%) existing in more than four fully characterized forms. One of the most polymorphic in this elite set, 5-methyl-2-[(2-nitrophenyl)amino]thiophene-3-carbonitrile (1), is used to synthesize the antipsychotic drug olanzapine and is known as ROY because of the red, orange, and yellow colors of its various polymorphs. The polymorphic behavior of ROY has been subjected to intense scrutiny for over two decades, both by experimental and computational methods, and the compound has been reported to exist in 12 fully described forms structurally characterized by single-crystal X-ray diffraction. Only aripiprazole (9 forms), flufenamic acid (8 forms), and galunisertib (7 forms) are known to be similarly polymorphic.

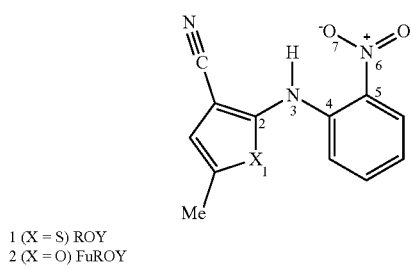

1 (X = S) ROY
2 (X = O) FuROY

The molecular structures of ROY and FuROY, with atomic numbering used.

In sum, many molecules have a theoretical ability to crystallize in numerous energetically-accessible ways, yet few compounds have been shown to be highly polymorphic, and in no cases have more than 12 forms been structurally characterized by single-crystal X-ray diffraction. This paradox underscores the inadequacy of current ways to access latent polymorphic diversity. Present techniques of crystallization and methods of polymorphic screening have evolved during centuries of study and are extensively compiled in many books, yet new tools are needed to conduct polymorphic screening in an attempt to expand the range of forms available. Targets include not only less stable polymorphs but also the most stable forms, which can be challenging to obtain if their crystallization is kinetically disfavored.

The mechanism of crystallization remains mysterious, even though the phenomenon is commonplace. It appears to proceed by nucleation, in which components associate to form an aggregate large enough to ensure that further growth is energetically more favorable than dissociation. Nucleation is often a heterogeneous phenomenon involving contact with surfaces that have an affinity for the compounds undergoing crystallization and thereby facilitate their initial aggregation. This is the basis for the widespread practice of inducing crystallization by homoseeding, in which compounds in supersaturated solutions, supercooled melts, vapor phase, or other states are exposed to existing crystals of the same compound in pure form. Homoseeding is particularly effective because the surfaces of the seeds are favorably ordered and identical in composition to the compounds being crystallized.

Homoseeding helps initiate crystallization predictably and typically yields new crystals with the structure of the seeds, although different polymorphs can occasionally arise. In the well-studied case of ROY, for example, seeds of the Y polymorph (yellow prisms) induce crystallization of the same form, but the R form (red prisms) can trigger nucleation of the YN polymorph (yellow needles). Better suited than homoseeding as a source of polymorphic diversity are crystallizations induced by intentionally introducing foreign surfaces, which can have various degrees of order and affinity for compounds of interest. Potentially useful surfaces include those created by depositing polymers or molecular monolayers on various solid supports. It is also possible in certain cases to induce crystallization by using crystals of a different compound as heteroseeds. However, crystallizations are normally selective processes, and components that fit properly in the growing lattice are recruited preferentially, while others are rejected. As a result, crystallization is a standard method of purification, and successful heteroseeding is uncommon.

In the present description, the concept of mixed-crystal seeding is generally set forth, followed by a case study outlining a polymorphic screening of ROY by mixed-crystal seeding.

Definitions

The terms "polymorphism", "polymorph", and "polymorphic form", as used herein, refer to the ability of a solid material to exist in more than one form or crystal structure. Polymorphism has great practical importance, because polymorphic forms can differ in solubility, melting point, density, color, and other basic properties. As a result, controlling polymorphism is a central preoccupation in all fields where solid materials are used. For example, different solid forms with varying solubility are sought to adjust the bioavailability of drugs, foodstuffs, and agrochemicals. Polymorphs of pigments can vary usefully in color, and forms of explosive solids can be selected to resist inadvertent detonation. In many fields, crystallizations of compounds of interest are examined exhaustively to uncover the widest possible range of forms.

The term "target compound", as used herein, refers to a chemical compound that can be of interest in one or more various fields. Without being limiting, the target compound can be relevant to the fields of pharmaceuticals, pigments, explosives, materials, agrochemicals, cosmetics, and food chemistry. In the case of pharmaceuticals, without being limiting, the target compound can for example be a drug candidate at any stage of its development. It should be understood that the term "target compound" can include a compound in the form of a neutral molecule, a compound in the form of a salt of a neutral compound, a compound in the form of a solvate of a neutral compound or a salt, or a compound in the form of a cocrystal of a neutral compound or a salt, in combination with one or more components that act as coformers of the cocrystal.

The expressions "polymorphic screening" and "screening a target compound for polymorphic forms", as used herein, refer to the process of investigating a target compound to explore its polymorphism. Polymorphic screening can include various activities, including searching for different forms and examining them for diverse properties, such as their relative stabilities.

The terms "mixed crystal" and "solid solution", as used herein, refer to multicomponent crystalline materials in which the components do not have fixed ratios or occupy regular positions in the crystal lattice. As such, mixed crystals differ from other multicomponent crystalline materials such as cocrystals and solvates that have defined stoichiometries and periodic crystalline structures. In mixed crystals, the solid phase features a degree of structural disorder as well as certain properties that are characteristic of liquid solutions. As with liquid solutions, the stoichiometry of mixed crystals is not limited to a single integral value but can be varied continuously over a range. Furthermore, as with liquid solutions, solubility in the solid state is not necessarily unlimited and can in some instances be observed in a narrower range of compositions. Mixed crystals and the differences between them, cocrystals, and solvates are described, for example, in *Cryst. Growth Des.* 2018, 18, 3704-3712, and *Cryst Eng Comm* 2018, 20, 7042-7052, which are incorporated by reference in their entirety. It is understood that in the present description, the terms "mixed crystal" and "solid solution" are used interchangeably.

The term "homoseeding", as used herein, refers to a process in which a target compound in a supersaturated solution, supercooled melt, vapor phase, or related states susceptible to crystallization is exposed to existing crystals of the same compound in essentially pure form, with the goal of inducing crystallization of the target compound.

The term "heteroseeding", as used herein, refers to a process in which a target compound in a supersaturated solution, supercooled melt, vapor phase, or related state is exposed to existing crystals of a different chemical compound in essentially pure form, with the goal of inducing crystallization of the target compound.

The terms "structural analog", "structurally analogous to the target compound", and "mimic", as used herein, refer to compounds having a chemical structure similar to that of the target compound, but differing from it in respect to at least one aspect. For example, a structural analog can differ from the target compound in one or more atoms, functional groups, or substructures, which are replaced with other atoms, groups, or substructures. Structural analogs can be isoelectronic, although this is not a requirement. Structural analogs can also be isomers, including stereoisomers and isotopic isomers. In the context of the present description, structural analogs are selected for their ability to form mixed crystals with a target compound. It is understood that in the present description, the terms "structural analog" and "mimic" are used interchangeably.

The terms "mixed-crystal seed" and "mixed-crystal seeding", as used herein, refer to a process in which a target compound in a supersaturated solution, supercooled melt, vapor phase, or related conditions is exposed to existing mixed crystals consisting essentially of the target compound and at least one structural analog that is structurally analogous to the target compound, with the goal of inducing crystallization of the target compound.

The term "salt" of a neutral target compound HA, as used herein, refers to an ionic derivative such as the product of protonation by the acid HX ($H_2A^+X^-$) or the product of deprotonation by the base B ($A^-BH^+$). In selecting structural analogs of salts for the purpose of making mixed crystals, it is possible to consider altering the cation, the anion, or both. An attractive feature of using mixed-crystalline salts in polymorphic screening is that the ion of greater structural complexity can be kept unchanged, and the simpler counterion can be substituted by readily available structural analogs.

The term "solvate" of a target compound TC, as used herein, is a crystalline form of TC in which molecules of solvent S occupy specific positions in the lattice and are normally present in a defined molar ratio, as represented by $TC \cdot S_n$. Solvates include hydrates, in which molecules of water are present in the crystalline lattice. Solvates are distinguished from other cocrystalline solids by the fact that S must be a liquid under ambient conditions. In more complex solvates, more than one type of solvent molecule may be included in the structure. In selecting structural analogs of solvates for the purpose of making mixed crystals, it is possible to consider altering the target compound TC, the solvent S, or both. An attractive feature of using mixed-crystalline solvates in polymorphic screening is that TC can be kept unchanged, and the more easily varied solvent can be substituted by readily available structural analogs.

The term "cocrystal" of a target compound TC, as used herein, is a crystalline form of TC in which molecules of a second compound C occupy specific positions in the lattice and are present in a defined molar ratio, as represented by $TC \cdot C_n$. Cocrystals are distinguished from solvates by the fact that coformer C is normally a solid under ambient conditions. In more complex cocrystals, more than one type of added compound may be included in the structure. In selecting structural analogs of cocrystals for the purpose of making mixed crystals, it is possible to consider altering the target compound TC, the coformer C, or both. An attractive feature of using mixed-crystalline cocrystals in polymorphic screening is that TC can be kept unchanged, and the more easily varied coformer C can be substituted by readily available structural analogs.

The terms "isomer" and "isomeric", as used herein, refer to chemical compounds having identical formulas but distinct structures, as well as to compounds that differ only in the replacement of an element by another isotope, particularly hydrogen by deuterium. Examples of isomers include the set of compounds propan-1-ol, propan-2-ol, and methyl ethyl ether, or the set of compounds propadiene and propyne. The term "isomer" is not limited to "constitutional isomers" but also includes "stereoisomers" such as "enantiomers" (stereoisomers that are non-superimposable mirror images of one another), "diastereoisomers" (stereoisomers that are not related by a symmetry operation), or "isotopic isomers", which differ only in the replacement of one or more constituent elements by an isotope of that element. In the context of the present description, isomeric compounds can, for example, be selected by making small structural alterations to the target compound, such as by changing the position of substitution of one or more functional groups. When the target compound is chiral, its structural analogs can include the enantiomer of the target compound, as well as structural analogs of the enantiomer. When the target compound has stereogenic centers and is one of a set of potential diastereoisomers, structural analogs of the target compound can include any of the other diastereoisomers, as well as structural analogs of the diastereoisomers.

The terms "isostere" and "isosteric", as used herein, refer to compounds that have different chemical formulas but that exhibit the same or similar steric behavior and/or the same or similar electronic properties. In some scenarios, isosteric compounds can involve small modifications to a target compound in a manner similar to what is performed by medicinal chemists to prepare libraries of active compounds. In the context of the present description, isosteric compounds are able to replace the target compound in the crystalline lattice in the sense that they can occupy approximately the same volume. As such, the size and shape of the isosteric compound should normally resemble those of the target compound. Isosteric compounds can be derived from a target compound by formally replacing a single atom by another (e.g. replacing a sulfur atom by an oxygen atom, or by replacing a hydrogen atom by a fluorine atom), by formally replacing an element by an isotope of that element (e.g. replacing a hydrogen atom by a deuterium atom), or by formally replacing a group of atoms (i.e. a functional group) by a related group (e.g. substitution of Me by Cl, substitution of $NO_2$ by COMe, or substitution of $CH_3$ by $CF_3$). In principle, any position in a target compound can be subjected to substitutions of these types and still allow the formation of mixed crystals. It is also understood that more than one position can be modified at a time.

Examples of isosteric replacements can be found in *Bioisosteres in Medicinal Chemistry*, First Edition, 2012, Wiley, Chapter 2, which is hereby incorporated by reference in its entirety. Without being limiting, examples of isosteric replacement that may be suitable to generate isosteric structural analogs of a target compound are provided below, as a general guideline.

Monovalent Atoms and Groups:

| | | | | | |
|---|---|---|---|---|---|
| —H | —F | —Cl | —Br | —I | —$CH_3$ |
| —OH | —$NH_2$ | —$CH_3$ | —OR | —SH | —$PH_2$ |

Bivalent Atoms and Groups:

| | | | | |
|---|---|---|---|---|
| —O— | —S— | —Se— | —$CH_2$— | —NH— |

Trivalent Atoms and Groups:
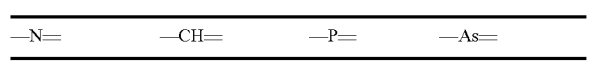
Tetravalent Atoms:
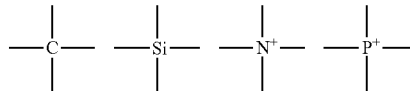
Ring Equivalents:
| —CH=CH— | —S— | —CH$_2$— | —S— |
| =CH— | | | =N— |
| —O— | | | —NH— |
Carbonyl Group:
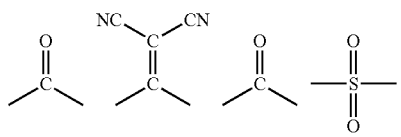
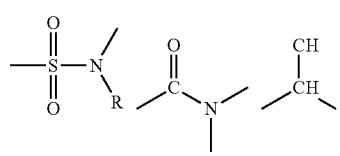
Carboxylic Acid:
| CO$_2$H | SO$_2$NHR | SO$_3$H |
| PO(OH)NH$_2$ | PO(OH)OEt | CONHCN |
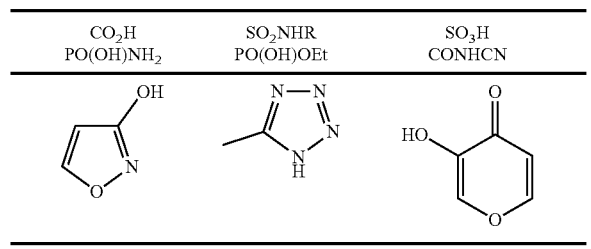
Hydroxyl Group:
| OH | NHCOR | NHSO$_2$R | CH$_2$OH | NHCONH$_2$ | NHCN | CH(CN)$_2$ |
Catechol:
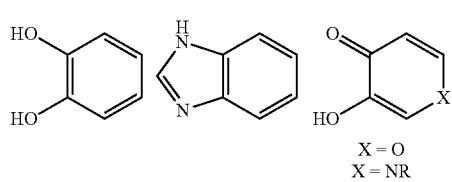
-continued
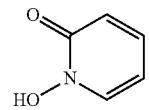
Halogens:
| F, Cl, Br, I | CF$_3$ | CN | N(CN)$_2$ | C(CN)$_3$ |
Amides and Esters:
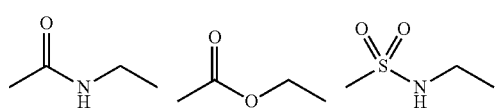
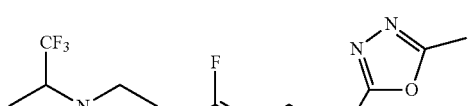
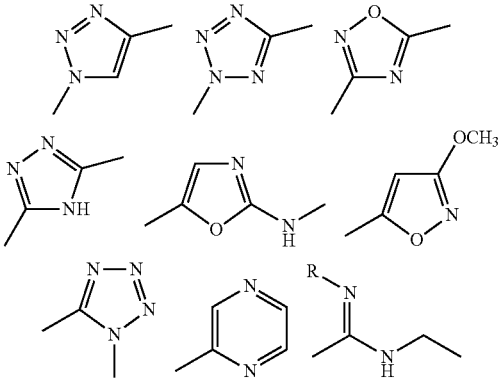
-continued
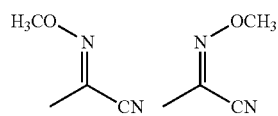

Thiourea:

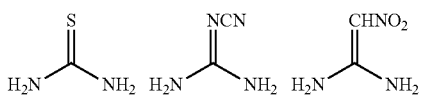

Pyridine:

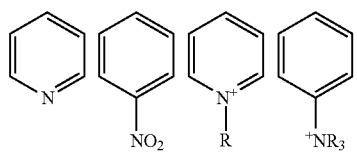

Thiophene ring: may be replaced by a benzene ring.

The terms "quasi-isostere" and "quasi-isosteric", as used herein, refer to compounds that can have different chemical formulas and that exhibit a slightly less close relationship in size and shape. In the context of the present description, a quasi-isosteric compound therefore exhibits greater changes in size and shape compared to an isosteric compound as defined above. Without being limiting, examples of quasi-isosteric replacements include replacing a methyl group by an ethyl group (larger replacement) or by a hydrogen atom (smaller replacement), or replacing a six-membered ring by a seven-membered ring (larger replacement) or by a five-membered ring (smaller replacement). Replacements that can be considered to be quasi-isosteric will vary somewhat according to the size of the target compound. For example, replacing a hydrogen atom in benzene by a methyl group to give toluene increases the molecular volume of benzene by about 18%, whereas the same replacement in the larger molecule naphthalene to produce 2-methylnaphthalene increases the molecular volume by only about 13%. In this way, the scope of replacements that can be called quasi-isosteric will increase as the target compound becomes larger.

The term "library" used in the expressions "library of mixed-crystal seeds" or "library of structural analogs", as used herein, refers to a finite number of mixed-crystal seeds and structural analogs (i.e. at least one mixed-crystal seed or at least one structural analog). Preferably, a library of mixed-crystal seeds is at least two mixed-crystal seeds, and a library of structural analogs is at least two structural analogs.

The term "crystallization medium", as used herein, refers to a solution, a melt, a suspended melt in a liquid, a vapor, a solid, a mixture of solids, or any other suitable medium in which crystallization of a target compound can be performed.

As used herein, "essentially", as used in "consisting essentially of" and "essentially pure", limit the scope of the specified material or composition to the recited chemical components but does not exclude the possibility that trace amounts or low levels of other chemical components can be present in the specified material or composition.

In the present description, most exemplary embodiments are illustrated with a two-component system comprising a target compound and a structural analog. However, it is understood that the same techniques may be applied with a multicomponent system comprising a target compound and a plurality of structural analogs.

Method for Polymorphic Screening

The present description provides a method for screening for polymorphs of a target compound. The method can include providing a library of mixed-crystal seeds, where each mixed-crystal seed consists essentially of the target compound and another component that is structurally analogous to the target compound. For each mixed-crystal seed in the library of mixed-crystal seeds, crystallization trials involving the target compound can be carried out. In some scenarios, the mixed-crystal seed is introduced into a crystallization medium that includes the target compound, with the goal of crystallizing the target compound. When crystals of the target compound are formed, the crystals can be characterized by techniques known in the art as ways to identify polymorphic forms and assess their properties.

FIG. 1 provides a schematic diagram showing how a library of structural analogs can be generated. One or more isomeric, isosteric, and/or quasi-isosteric structural analogs of a target compound (TC) can be synthesized to obtain a library of n structural analogs ($SA_1$, $SA_2$, $SA_3$, $SA_4$ ... $SA_n$), where n is an integer equal to or greater than 1. Preferably, n is an integer equal to or greater than 2. It is understood that the chemical structure of each structural analog can vary and will greatly depend on the nature of the target compound. In some embodiments, the library of structural analogs consists of isomeric structural analogs. In some embodiments, the library of structural analogs consists of isosteric structural analogs. In some embodiments, the library of structural analogs consists of quasi-isosteric structural analogs. In some embodiments, the library of structural analogs consists of at least one of isomeric, isosteric, and quasi-isosteric structural analogs.

Figure 2:
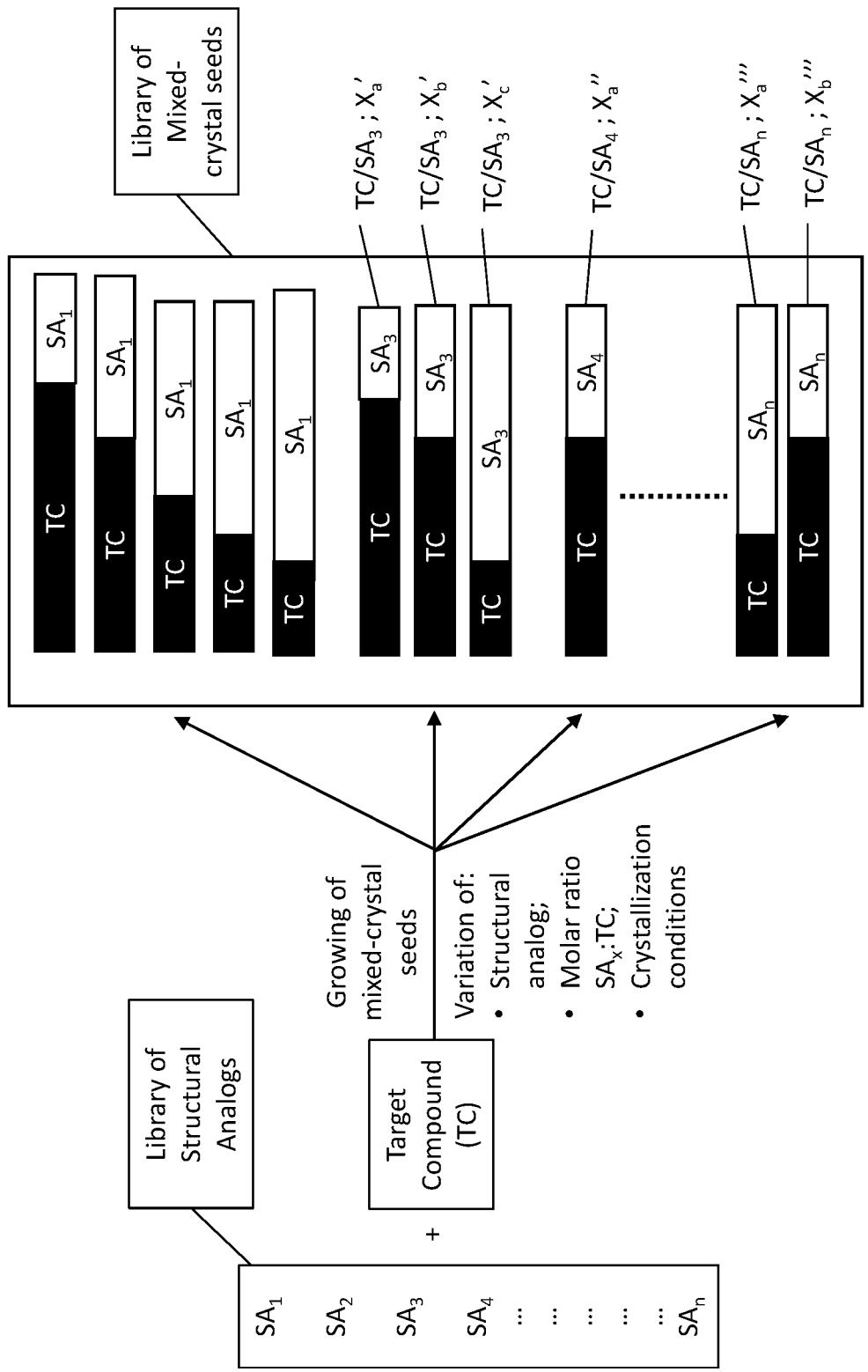
FIG. 2 is a schematic diagram showing how a library of mixed-crystal seeds can be generated from a library of structural analogs.

FIG. 2 shows how the structural analogs ($SA_1$, $SA_2$, $SA_3$, $SA_4$ ... $SA_n$) can then be used to generate a library of mixed-crystal seeds. For each structural analog in the library of structural analogs, crystallization trials are performed to obtain mixed crystals consisting essentially of the target compound and the structural analog.

It is understood that the range of compositions in the mixed crystals (i.e., the molar ratio $X=TC:SA_n$) for use in polymorphic screenings can vary. Depending on the structural similarity and crystallographic relationship between a target compound and structural analogs potentially suitable for forming mixed crystals, the accessible compositions can be expected to vary over a wide range. Preferably, the percentage of structural analog in the composition is raised enough to alter the crystal structure in ways that increase the probability of inducing the crystallization of new polymorphs. In some scenarios, mixed crystals considered for use in polymorphic screening are those in which all minor components, taken together, constitute more than 5% of the total composition on a molar basis. Such materials are distinctly different in composition from crystals that meet normal standards of purity in various areas of science. For example, the *Journal of Organic Chemistry*, a leading journal in the field of organic chemistry published by the American Chemical Society, sets the following standard for purity: "When new or known synthesized compounds are the study materials for physical measurements or bioassays, a purity level of at least 95% needs to be documented." In some scenarios, each mixed-crystal seed comprises the target compound and the structural analog in a molar ratio varying between 95:5 and 5:95, 90:10 and 10:90, 85:15 and 15:85, 80:20 and 20:80, 75:25 and 25:75, 70:30 and 30:70, 65:35 and 35:65, 60:40 and 40:60, or 55:45 and 45:55.

It is also understood that for each structural analog and even for each molar ratio of the target compound/structural analog, the crystallization conditions (such as the crystallization temperature and crystallization technique) can be varied to enhance the likelihood that mixed crystals can be obtained, to change the ratio of the components, or to alter the structural arrangement of the components. Finally, it is also understood that not all crystallization trials involving mixtures of the target compound and a structural analog will yield a mixed crystal. The number of mixed crystals obtained for each structural analog can also vary depending on the structural analog and the number of crystallization conditions tested. For example, in FIG. 2, structural analog $SA_1$ yields five (5) mixed crystals of different molar ratios; structural analog $SA_2$ does not yield any mixed crystals; structural analog $SA_3$ yields three (3) mixed crystals of different molar ratios; structural analog $SA_4$ yields one (1) mixed crystal; and structural analog $SA_n$ yields two (2) mixed crystals of different molar ratios.

Many methods for making mixed crystals for use as seeds in polymorphic screening can be used. In the case of two-component systems, the target compound and a structural analog can be mixed in various ratios to obtain a mixture. The mixture can then be crystallized in various ways. For example, the mixture can be heated on a hot stage to produce a homogeneous melt, and the melt can be allowed to crystallize. Another possibility involves melting the component of the mixture having the lower melting point (the first component), adding an amount of the second component of the mixture, letting the second component dissolve into the melted first component, and allowing the mixture to cool. As yet another example, the components can be dissolved in various ratios in a solvent or mixture of solvents, and volatile components can then be allowed to evaporate. It is also possible to produce mixed crystals by other standard methods of crystallization, such as by heating the components in various ratios in a solvent or mixture of solvents to produce a solution, followed by allowing the solution to cool. Producing mixed crystals from solutions offers the potential advantage of obtaining them in the form of single crystals that can be characterized by various methods, including single-crystal X-ray diffraction. Other ways to produce mixed crystals include grinding the components together by hand or in a mechanical mill, simultaneous sublimation, and other methods that will be known to a person skilled in the art. Finally, all of these methods are potentially suitable for making mixed crystals that contain the target compound and more than one other component.

Figure 3:
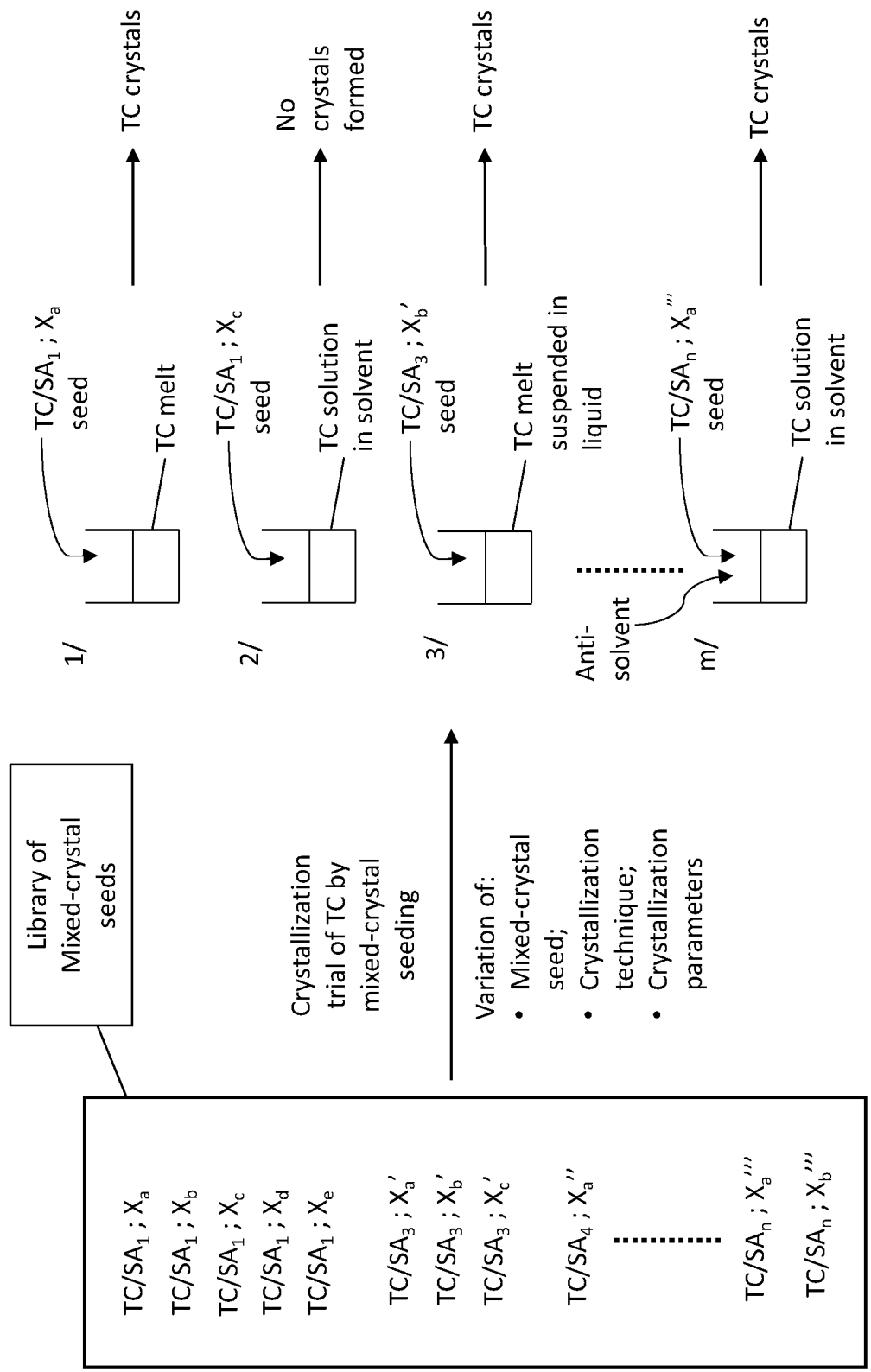
FIG. 3 is a schematic diagram showing a crystallization trial of a target compound using mixed-crystal seeding.

Once mixed-crystalline material is obtained by such methods, it can be used in attempts to seed crystallization of the target compound, as shown in FIG. 3. One or more of the mixed-crystal seeds from the library of mixed-crystal seeds can be used in attempts to seed crystallization of the target compound. For each mixed-crystal seed, various crystallization techniques and/or various crystallization conditions may be used. For example, a mixed-crystalline seed can be inserted into a supercooled droplet prepared by melting a sample of the target compound and allowing the melted sample to cool below its normal melting point so that spontaneous unseeded crystallization or vitrification do not intervene. The resulting crystalline material can be analyzed by various methods such as Raman microscopy to identify polymorphs that are formed. In addition, the resulting material can be used in attempts to induce the formation of single crystals by conventional methods. Non-limiting examples of such methods include crystallization by seeding solutions, grinding, sublimation, or by suspended-melt crystallization, which will be described in detail below.

In the embodiment shown at FIG. 3, a number of crystallization attempts (or crystallization trials) of the target compound are performed. Crystals of the target compound are obtained in some of the crystallization attempts, and no crystals are formed in at least one of the crystallization attempts. It is understood that since the method described herein is a screening method, not all crystallization attempts will lead to the formation of crystals of the target compound.

Suspended-Melt Crystallization

The present description also provides a method for performing suspended-melt crystallization. In suspended-melt crystallizations, a molten sample of a target compound is dispersed in a vigorously stirred heated liquid in which the compound is virtually insoluble. The mixture is then cooled below the melting point of the suspended compound, and crystallization is allowed to proceed spontaneously or is induced by adding a suitable seed or another foreign surface. The suitable seed can, for example, be a homoseed, a heteroseed, or a mixed-crystal seed. In some scenarios, the seed is added shortly after (e.g. immediately after) the mixture is cooled below the melting point of the suspended compound.

The suspension can be prepared by melting the target compound and adding the melt to a suitable preheated liquid. Alternatively, the compound can be suspended in solid form, and the liquid can be heated above the melting point. In cases where the target compound is an organic compound with low solubility in water, water is a potentially suitable medium for creating suspensions, particularly below 100° C. At higher temperatures, ethylene glycol, glycerol, or related liquids may be suitable media. Possible alternatives also include fluorocarbons, silicone oils, mercury, and other substances that are liquids at or near room temperature. In cases where the target compound is ionic and soluble in water, a wide range of organic solvents can be considered for use as the medium of suspension.

As a way to induce crystallization, the use of liquid-suspended melts is virtually as simple as seeding pure supercooled melts on a hot stage but offers multiple potential advantages. In particular, it can allow the formation of single crystals suitable for structural analysis by X-ray diffraction. Without being bound by theory, suspended-melt crystallization appears to work in this way by giving droplets the freedom to move and change shape needed to facilitate the emergence of distinct single crystals. In principle, the method can be used to obtain the most stable polymorph of a target compound under the conditions of crystallization, as well as less stable forms. However, a notable feature of suspended-melt crystallization is its suitability for producing metastable polymorphs under conditions that inhibit subsequent solvent-induced conversion into more stable forms.

Case Study I: Polymorphic Screening of Roy and FuROY

Synthesis of FuROY

In an effort to make heteroseeding a more productive source of new polymorphs, the use of seeds made by crystallizing close mimics of target compounds was examined. To put this approach to a test, one goal was to obtain new forms of ROY. For most existing compounds, numerous energetically-accessible polymorphs remain undiscovered, so creating a new form is not necessarily a notable achievement. In contrast, the behavior of ROY has been probed relentlessly for many years by experts in polymorphism, leading to 7 forms that were fully described and characterized by single-crystal X-ray diffraction before 2020. As a result, any polymorphic screening method that yields a new form of ROY demonstrates its effectiveness.

The known polymorphs of ROY differ most notably in the value of $\theta_{hetero}$, which is the torsional angle $X_1$-$C_2$-$N_3$-$C_4$. This angle helps controls the degree of conjugation between the thiophene ring and the (2-nitrophenyl)amino substituent, which gives rise to the observed range of red, orange, and yellow colors. In contrast, variations in the torsional angles $C_2$-$N_3$-$C_4$-$C_5$ ($\theta_{phenyl}$) and $C_4$-$C_5$-$N_6$-$C_7$ ($\theta_{nitro}$) are normally small, although they can also contribute to variations in color. Polymorphs with values of |$\theta_{hetero}$| near 0° or 180° tend to be more nearly planar and reddish, whereas forms with values of |$\theta_{hetero}$| closer to 90° are more twisted, less conjugated, and yellowish. A set of mimics was prepared, closely similar to ROY in molecular size and shape, but with modifications designed to alter conformational preferences in subtle ways. In the set was furan 2, which differs from ROY only by having an atom of oxygen in place of an atom of sulfur.

As shown in Scheme 1, furan 2 was synthesized by Hartwig-Buchwald coupling of 1-bromo-2-nitrobenzene with 2-amino-5-methylfuran-3-carbonitrile (3). To make compound 3, dihydro derivative 4 was prepared by treatment of malononitrile with sodium ethoxide, followed by addition of propylene oxide. Dihydrofuran 4 was converted into 4-nitrophenylbenzamide 5, and the product was oxidized with DDQ to prepare N-protected 2-aminofuran 6. Deprotection was achieved in two steps by forming imidoyl chloride 7 and subjecting it to hydrolysis in hot ethylene glycol/quinoline containing small amounts of water, thereby providing 2-amino-5-methylfuran-3-carbonitrile (3). FuROY formed mixed crystals with ROY. The mixed crystals seeded the crystallization of ROY, and two new polymorphs of ROY were produced in the form of single crystals suitable for structural analysis by X-ray diffraction.

Synthesis of Other Mimics of ROY

In addition to FuROY, compounds 8-9 were synthesized, in which single atoms or functional groups in ROY have been replaced by others that do not greatly change molecular size and shape. Like FuROY, both compounds 8-9 can form mixed crystals with ROY, which can be used to screen for new polymorphs of ROY.

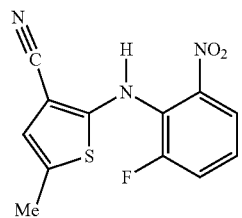

8

Scheme 1

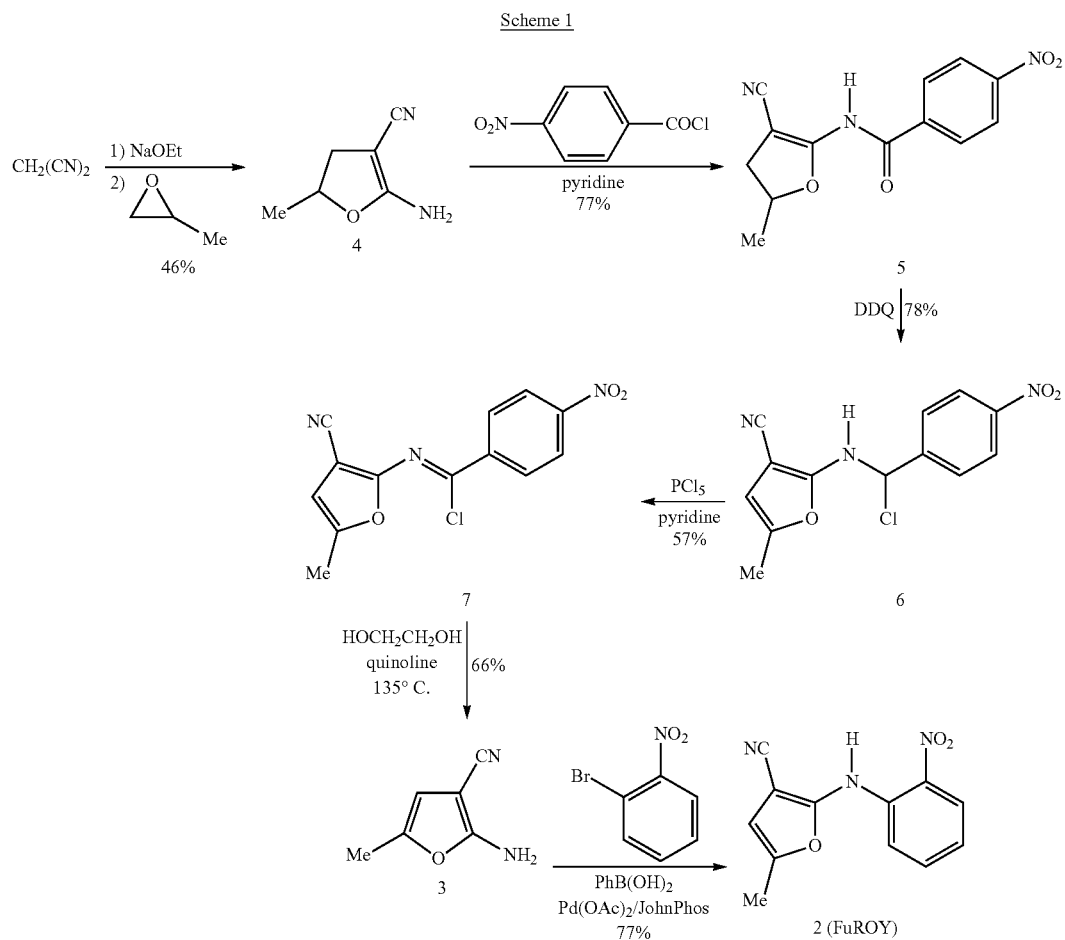

2-((2-Fluoro-6-nitrophenyl)amino)-5-methylthiophene-3-carbonitrile

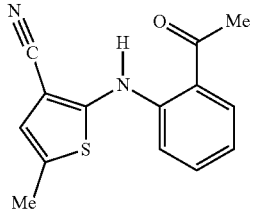

2-((2-Acetylphenyl)amino)-5-methylthiophene-3-carbonitrile

Other Mimics of ROY

Mimics 8-9 were crystallized in initial trials to give one polymorph of compound 9 and three forms of compound 8. Systematic attempts to produce more polymorphs were not carried out. Crystals of pure analog 8 (in the three forms obtained in initial trials) were able to act as heteroseeds to induce the crystallization of supercooled melts of ROY. Crystals of pure analog 9 had no effect. Like FuROY, however, both compounds 8-9 form mixed crystals with ROY.

Polymorphs of ROY Obtained by Mixed-Crystal Seeding

Like ROY itself and various related compounds, furan 2 crystallizes to form multiple red, orange, and yellow polymorphs, so FuROY is an appropriate name for the new compound. Initial work yielded multiple polymorphs and solvates of FuROY, including three in the form of unsolvated single crystals suitable for analysis by X-ray diffraction. Selected structural data and other properties for the three initially characterized forms of FuROY are summarized in Table 1, and the corresponding data for the 7 fully described polymorphs of ROY characterized by single-crystal X-ray diffraction before 2020 are compiled in Table 2 for comparison.

TABLE 1

Structural Data for Initial Polymorphs of FuROY, as Determined by Single-Crystal X-Ray Diffraction, and Other Selected Properties

| form | OY | R | OR |
|---|---|---|---|
| description | orange-yellow prisms | red rectangles | orange-red needles |
| crystal system | monoclinic | orthorhombic | triclinic |
| space group | C2/c | Pnna | P$\bar{1}$ |
| a (Å) | 23.2603(10) | 22.3314(8) | 7.3803(13) |
| b (Å) | 6.8371(3) | 13.9004(5) | 8.2580(11) |
| c (Å) | 14.6629(6) | 7.2164(3) | 20.722(3) |
| α (deg) | 90 | 90 | 89.248(9) |
| β (deg) | 112.324(1) | 90 | 88.452(12) |
| γ (deg) | 90 | 90 | 63.458(9) |
| V (Å$^3$) | 2157.11(16) | 2240.08(15) | 1129.4(3) |
| Z | 8 | 8 | 4 |
| Z' | 1 | 1 | 2 |
| $\rho_{calc}$ (g · cm$^{-3}$) | 1.498 | 1.422 | 1.430 |
| T (K) | 100 | 200 | 100 |
| $R_1$, I > 2σ(I) | 0.0368 | 0.0555 | 0.0896 |
| w$R_2$, I > 2σ(I) | 0.0960 | 0.1265 | 0.2334 |
| GoF | 1.052 | 1.157 | 1.012 |
| $|\theta_{hetero}|$ (deg) | 55.73(19) | 22.44(18) | 0.1(8), 9.5(9) |
| $v_{CN}$ (cm$^{-1}$) | 2234 | 2212 | 2215 |
| mp (° C.) | 102 | 93 | a |

[a] Too unstable to be prepared in pure form in quantities needed for thermal analysis

TABLE 2

Structural Data for All Previously Reported Fully Described Polymorphs of ROY reported before 2020, as Determined by Single-Crystal X-Ray Diffraction, and Other Selected Properties

| | form | | | | | | |
|---|---|---|---|---|---|---|---|
| | Y | YT04 | R | OP | ON | YN | ORP |
| description | yellow prisms | yellow prisms | red prisms | orange plates | orange needles | yellow needles | orange-red plates |
| $|\theta_{hetero}|$ | 104.7 | 112.8 | 21.7 | 46.1 | 52.6 | 104.1 | 39.4 |
| $v_{CN}$ (cm$^{-1}$) | 2231 | 2224 | 2212 | 2226 | 2224 | 2222 | 2217 |
| crystal system | monoclinic | monoclinic | triclinic | monoclinic | monoclinic | triclinic | orthorhombic |
| space group | P2$_1$/n | P2$_1$/n | P-1 | P2$_1$/n | P2$_1$/c | P-1 | Pbca |
| a (Å) | 8.5001 | 8.2324 | 7.4918 | 7.9760 | 3.9453 | 4.5918 | 13.177 |
| b (Å) | 16.413 | 11.8173 | 7.7902 | 13.319 | 18.685 | 11.249 | 8.0209 |
| c (Å) | 8.5371 | 12.3121 | 11.9110 | 11.676 | 16.3948 | 12.315 | 22.801 |
| α (deg) | 90 | 90 | 75.494 | 90 | 90 | 71.194 | 90 |
| β (deg) | 91.767 | 102.505 | 77.806 | 104.683 | 93.830 | 89.852 | 90 |
| γ (deg) | 90 | 90 | 63.617 | 90 | 90 | 88.174 | 90 |
| V (Å$^3$) | 1190.5 | 1169.36 | 598.88 | 1199.9 | 1205.9 | 601.85 | 2409.8 |
| Z | 4 | 4 | 2 | 4 | 4 | 2 | 8 |
| Z' | 1 | 1 | 1 | 1 | 1 | 1 | 1 |
| $\rho_{calc}$ (g · cm$^{-3}$) | 1.447 | 1.473 | 1.438 | 1.435 | 1.428 | 1.431 | 1.429 |
| T (K) | 293 | 296 | 293 | 295 | 293 | 296 | 296 |
| mp (° C.) | 109.8 | 106.9 | 106.2 | 112.7 | 114.8 | 99 | 97 |

As in the case of polymorphs of ROY (Table 2), forms of FuROY (Table 1) have the following characteristic features: (1) $|\theta_{hetero}|$ varies widely, and values near 0° and 180° are associated with greater conjugation and a red shift in color; (2) the stretching frequency of the CN group ($v_{CN}$, as measured by Raman spectroscopy) increases as $|\theta_{hetero}|$ approaches 90°; (3) an intramolecular N—H . . . O hydrogen bond is present in the (2-nitrophenyl)amino group; and (4) all atoms in the (2-nitrophenyl)amino group are virtually coplanar ($|\theta_{phenyl}|$=173.55, 172.30, and 179.05/173.57° in forms OY, R, and ORN, respectively, and $|\theta_{nitro}|$=2.77, 0.48, and 11.61/11.90°). Despite the close molecular similarity of ROY and FuROY, no pairs of structures in Tables 1 and 2 are isostructural.

In ROY, FuROY, and related compounds, shared elements that appear to favor polymorphism include (1) widely variable torsional angles $\theta_{hetero}$, in addition to other angles ($\theta_{phenyl}$ and $\theta_{nitro}$) that can accommodate small changes; and (2) an absence of dominant directional intermolecular interactions, which ensures that repositioning neighboring molecules is not energetically costly. However, there are also noteworthy differences between the polymorphic natures of ROY and FuROY: (1) The three forms of FuROY described in Table 1 are not isostructural with respect to known forms of ROY shown in Table 2; (2) FuROY yields solvates, whereas solvates of ROY have never been reported; (3) Z'=2 in the OR form of FuROY, but Z'=1 in all seven structures of ROY in Table 2; and (4) the smallest value of $|\theta_{hetero}|$ observed for ROY is 21.7° (Table 2), whereas the furan and (2-nitrophenyl)amino groups in form OR of FuROY attain near coplanarity (Table 1), presumably because oxygen has a smaller van der Waals radius than sulfur.

The near identity of FuROY and ROY suggested that heteroseeds composed of FuROY would induce the crystallization of ROY. Moreover, structural differences between the polymorphs of FuROY and those of ROY indicated that heteroseeds of FuROY might cause ROY to crystallize in new ways. In fact, introducing crystals of polymorphs OY, R, and OR of FuROY into supercooled melts of ROY at 70° C. had no effect. Similarly, heteroseeds consisting of various forms of ROY did not induce the crystallization of melts of FuROY. In addition, attempts to use crystals of forms OY, R, and OR of FuROY to heteroseed supersaturated solutions of ROY failed because FuROY is significantly more soluble than ROY in organic solvents, and the heteroseeds dissolved before inducing crystallization. Earlier work has shown that the crystallization of target compounds can sometimes be controlled by introducing additives that adhere to the surface of emerging crystals, inhibit their growth, and thereby allow new polymorphs to appear. However, crystallizations of ROY from solution under diverse conditions in the presence of small amounts of dissolved FuROY were not observed to yield new forms of ROY. Together, these various experiments establish that FuROY alone, either as a dissolved additive or as heteroseeds consisting of forms OY, R, or OR, does not appear to be able to induce the formation of new polymorphs of ROY.

In the course of these experiments, it was observed that mixed crystals with different compositions can be grown from solutions containing both ROY and FuROY. In mixed crystals, which are also called solid solutions, the components do not have fixed ratios or occupy regular positions in the lattice, whereas other multicomponent crystalline materials such as cocrystals and solvates have defined stoichiometries and periodic structures.

Mixtures of ROY and FuROY were able to crystallize together to form mixed crystals. The structures of selected mixed crystals were determined by single-crystal X-ray diffraction, and the resulting data are compiled in Table 3. The primarily component can be either ROY or FuROY. The three ROY-rich mixed crystals that were studied have structures resembling those of ROY forms ON or Y, which are the two most stable known polymorphs of ROY. Small variations in geometry result from incorporating FuROY in ROY form ON, but few parameters change monotonically with increasing amounts of the additive, suggesting that the observed structural alterations have a complex origin. The FuROY-rich mixed crystal described in Table 3 is noteworthy because its structure is not that of the three forms of pure FuROY described in Table 1, nor is it isostructural with any form of ROY characterized by single-crystal X-ray diffraction (Table 2). However, the structural parameters of the FuROY-rich mixed crystal proved to resemble in certain respects those determined by Rietveld refinement of X-ray powder diffraction patterns measured for the PO13 form of ROY, a polymorph named for its pumpkin-orange color and initial observation in 2013, but never obtained as single crystals or even in phase-pure form.

TABLE 3

Structural Data for Mixed Crystals of ROY and FuROY, as Determined by Single-Crystal X-Ray Diffraction, and Other Selected Properties

| | form | | | |
|---|---|---|---|---|
| | Mixed ROY ON | Mixed ROY ON | Mixed ROY Y | Mixed |
| description | orange needles | orange needles | yellow needles | orange-yellow needles |
| ratio ROY:FuROY[a] | 93:7 | 85:15 | 76:24 | 40:60 |
| crystal system | monoclinic | monoclinic | monoclinic | monoclinic |
| space group | $P2_1/c$ | $P2_1/c$ | $P2_1/n$ | $P2_1/c$ |
| a (Å) | 3.8603(2) | 3.8643(3) | 8.4024(2) | 4.0133(4) |
| b (Å) | 18.6172(10) | 18.7063(11) | 16.0107(4) | 22.502(3) |
| c (Å) | 16.3357(9) | 16.2605(10) | 8.5218(2) | 12.7868(16) |
| α (deg) | 90 | 90 | 90 | 90 |
| β (deg) | 92.759(2) | 92.736(3) | 90.787(1) | 95.858(6) |
| γ (deg) | 90 | 90 | 90 | 90 |
| V (Å$^3$) | 1172.65(11) | 1174.08(14) | 1146.32(5) | 1148.7(2) |
| Z | 4 | 4 | 4 | 4 |
| $\rho_{calc}$ (g · cm$^{-3}$) | 1.462 | 1.454 | 1.481 | 1.443 |
| T (K) | 150 | 150 | 100 | 150 |
| $R_1$, I > 2σ(I) | 0.0483 | 0.0693 | 0.0333 | 0.0896 |
| $wR_2$, I > 2σ(I) | 0.1186 | 0.1815 | 0.0859 | 0.2579 |

TABLE 3-continued

Structural Data for Mixed Crystals of ROY and FuROY, as Determined by
Single-Crystal X-Ray Diffraction, and Other Selected Properties

| | form | | | |
|---|---|---|---|---|
| | Mixed ROY ON | Mixed ROY ON | Mixed ROY Y | Mixed |
| GoF | 1.150 | 1.122 | 1.138 | 1.153 |
| $|\theta_{hetero}|$ (deg) | 54.2(2)/64.7(12) | 53.7(5)/57.8(17) | 107.5(X)/108.1(X) | 60.3(5)/63.3(7) |

[a]Ratios determined by crystallographic analysis and confirmed by $^1$H NMR spectroscopy.

It was unexpectedly discovered that mixed crystals containing both ROY and FuROY can act as seeds and can induce ROY to form single crystals of several polymorphs of ROY, including polymorph PO13 (never previously obtained in the form of single crystals and never characterized by single-crystal X-ray diffraction), as well as single crystals of a form of ROY never previously reported.

A seed of mixed-crystalline 40:60 ROY:FuROY was inserted into a supercooled droplet of molten ROY at 65° C., triggering the formation of a crystalline solid with a uniform orange color. The resulting solid was used to seed the crystallization of ROY from supersaturated solutions in either anhydrous EtOH or 1:1 ethyl acetate:hexane. This provided polymorph PO13 as pale orange needles suitable for structural analysis by X-ray diffraction. Table 4 provides structural data for form PO13 determined by powder diffraction and by single-crystal diffraction, as well as additional properties. Except for differences in density and unit-cell volume that reflect different temperatures of analysis, the structures deduced by powder diffraction and single-crystal diffraction are closely similar. The molecular structures of ROY in single crystals of the yellow or pale orange forms PO13, Y, YT04, and YN are all similarly twisted and poorly conjugated, with $|\theta_{hetero}|$=127.6, 104.7, 112.8, and 104.1°, respectively, and $v_{CN}$>2220. As in all other polymorphs characterized by single-crystal X-ray diffraction, the structure of form PO13 incorporates an intramolecular N—H . . . O hydrogen bond in the (2-nitrophenyl)amino group, and all atoms in the group are virtually coplanar (In $|\theta_{phenyl}|$=176.46° and $|\theta_{nitro}|$=1.84°).

TABLE 4

Structural Data Based on Single-Crystal X-Ray Diffraction for New
Polymorphs of ROY and FuROY Resulting from Mixed-Crystal
Seeding, Comparison with Structural Data for PO13 Derived from
Powder X-Ray Diffraction, and Other Selected Properties

| | form | | | |
|---|---|---|---|---|
| | ROY PO13 (single-crystal XRD) | ROY PO13 (powder XRD) | ROY Y19 | FuROY Y |
| description | pale orange needles | pumpkin-orange solid | yellow needles | yellow needles |
| crystal system | monoclinic | monoclinic | monoclinic | monoclinic |
| space group | P2$_1$/c | P2$_1$/c | P2$_1$/c | P2$_1$/c |
| a (Å) | 3.9696(8) | 4.12501(8) | 4.0286(3) | 3.952(4) |
| b (Å) | 22.591(5) | 22.7193(7) | 23.2739(16) | 21.870(16) |
| c (Å) | 12.705(2) | 12.7186(4) | 12.5799(10) | 12.864(12) |
| α (deg) | 90 | 90 | 90 | 90 |
| β (deg) | 97.231(14) | 97.730(2)[a] | 96.504(5) | 95.60(4) |
| γ (deg) | 90 | 90 | 90 | 90 |
| V (Å$^3$) | 1130.29(4) | 1181.12(6) | 1171.92(15) | 1106.6(16) |
| Z | 4 | 4 | 4 | 4 |
| ρ$_{calc}$ (g·cm$^{-3}$) | 1.524 | 1.45814(7) | 1.470 | 1.46 |
| T (K) | 100 | 298 | 100 | 100 |
| R$_1$, I > 2σ(I) | 0.0856 | 0.0798[b] | 0.0748 | 0.0813 |
| wR$_2$, I > 2σ(I) | 0.2109 | — | 0.1733 | 0.1977 |
| GoF | 1.043 | — | 0.970 | 1.000 |
| $|\theta_{hetero}|$ (deg) | 127.6(5) | 122.06 | 60.6(8) | 61.4(6) |
| $v_{CN}$ (cm$^{-1}$) | 2221 | 2228 | 2224 | 2231 |
| mp (° C.) | 100 | 100.0 | 96 | 88 |

[a]After transformation to the conventional monoclinic unit cell
[b]Residual of the Rietveld refinement In further experiments, small amounts of 40:60 ROY:FuROY mixed crystals were added as seeds to a vigorously stirred suspension of supercooled molten ROY in water at 70° C. This induced the formation of small yellow needles, along with polycrystalline solid. The needles were separated by hand, dried with absorbent paper, and analyzed by single-crystal X-ray diffraction. The crystals proved to be a new polymorph of ROY, named Y19. Structural data for form Y19 and additional properties are summarized in Table 4. The yellow color is consistent with a distinctly twisted molecular conformation ($|\theta_{hetero}|$=60.6°) and a value of $v_{CN}$ with a relatively high frequency (2224 cm$^{-1}$). As in other cases, an intramolecular N—H . . . O hydrogen bond is formed by the (2-nitrophenyl)amino group, which is essentially planar ($|\theta_{phenyl}|$=175.32° and $|\theta_{nitro}|$=6.00°). Without mixed-crystal seeding, aqueous suspensions of supercooled molten ROY only yielded known polymorphs (Table 2).

Suspending a supercooled melt of a target compound in a vigorously stirred liquid in which the compound is virtually insoluble, followed by adding a suitable seed, is a novel way to screen for polymorphs and to produce single crystals. This method of screening can be used with various types of seeds, including mixed-crystal seeds, homoseeds, and heteroseeds. Suspended-melt crystallization is particularly useful as a method of screening for metastable polymorphs and for producing them in crystalline form under conditions that inhibit subsequent solvent-induced conversion into more stable forms. As a method for inducing crystallization, the use of liquid-suspended melts is virtually as simple as seeding pure supercooled melts on a hot stage but offers the important advantage of facilitating the formation of single crystals suitable for structural analysis by X-ray diffraction. Without being bound by theory, suspended-melt crystallization appears to work by giving droplets the freedom to move and change shape needed to facilitate the emergence of distinct single crystals. The method promises to be of general value as a method of polymorphic screening and as a source of new polymorphs in forms that allow detailed characterization, particularly in the case of metastable polymorphs.

In 2012, Vasileiadis et al. reported the results of an ab initio prediction of polymorphs of ROY, in which CrystalPredictor was used as the global search algorithm and CrystalOptimizer as the local minimization algorithm. This study yielded a ranked list of 745 structures with lattice energies computed to be within approximately 4 kcal/mol of the global minimum. Polymorphs of ROY previously characterized by single-crystal X-ray diffraction before 2020 (YN, Y, R, YT04, OP, ORP, and ON, as shown in Table 2) match the predicted structures of Ranks 1, 2, 4, 5, 12, 77, and 129, respectively. In addition, form PO13 was determined earlier to correspond to the structure of Rank 24, based on analysis of powder X-ray diffraction data. A systematic survey of all other predicted polymorphs showed that new form Y19 closely matches Rank 144.

Other Potential Mimics of ROY

Other potential mimics of ROY are suitable for use in polymorphic screening using mixed-crystal seeding. To allow sites in the crystalline lattice of a target compound to be replaced by another substance, the size and shape of the replacement should normally resemble those of the primary component. This is illustrated by the relationship between ROY and various analogs studied, including FuROY and compounds 8-9. In these cases, the analogs are derived from ROY by formally replacing a single atom by another (substitution of S in ROY by 0 in FuROY, or H in ROY by F in compound 8), or by replacing a group of atoms by a related group (substitution of $NO_2$ in ROY by COMe in analog 9). In principle, any position in a target compound can be subjected to substitutions of these types without necessarily preventing the formation of mixed crystals. Moreover, it should also be possible to produce suitable mimics by modifying more than one position at a time. For example, replacing S by O in compounds 8-9 to give the corresponding furans should yield additional mimics potentially suitable for forming mixed crystals with ROY and for subsequent use in polymorphic screening.

Mimics resulting from the substitution of atoms or groups of atoms are not usually isomers of the target compound because they will typically have different compositions, as illustrated by FuROY and the other analogs 8-9 of ROY. However, it is likely that when isomers of target compounds are created by making small structural alterations such as changes in the position of substitution, the resulting substances will also prove to be suitable mimics. An example of a potentially suitable isomeric mimic of ROY is provided by compound 10, in which the 5-methyl group of ROY has been moved to the 4-position. In addition, it should be possible to combine changes both in composition and in the location of substituents, as illustrated by furan 11, which is the 4-methyl analog of FuROY.

4-Methyl-2-((2-nitrophenyl)amino)thiophene-3-carbonitrile

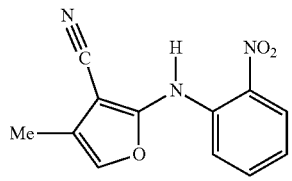

4-Methyl-2-((2-nitrophenyl)amino)furan-3-carbonitrile

Mimics 10 and 11 of ROY

Structural alterations that introduce greater changes in size and shape may also yield suitable mimics, particularly when the target compound tends to crystallize inefficiently and to form poorly packed lattices with substantial amounts of unoccupied volume, or when the mimic is only slightly larger or smaller than the target compound. In general, mimics that are slightly smaller than the target compound are expected to be more easily incorporated in mixed crystals than mimics that are slightly larger. For example, ROY, its ethyl-substituted analog 12, and unsubstituted compound 13 may form mixed crystals, although the capacity of the normal lattice of ROY (Me at position-5 of the thiophene ring) to accommodate slightly larger molecules of analog 12 (Et at position-5) is expected to be lower than its ability to accept slightly smaller molecules of compound 13 (H at position-5). Such differences may affect the range of compositions that can be achieved in mixed crystals but may not prevent the formation of mixed crystals altogether. Many related small structural alterations of ROY can be made to produce mimics potentially suitable for the formation of mixed crystals. For example, the thiophene ring can be replaced by a benzene ring, as illustrated by analog 14.

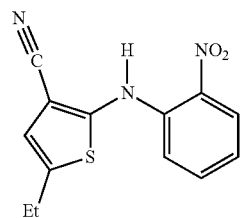

5-Ethyl-2-((2-nitrophenyl)amino)thiophene-3-carbonitrile

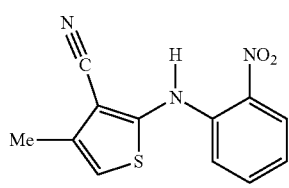

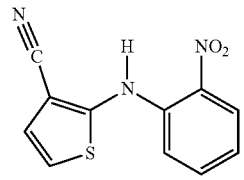

2-((2-Nitrophenyl)amino)thiophene-3-carbonitrile

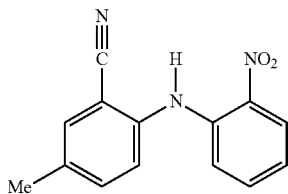

5-Methyl-2-((2-nitrophenyl)amino)benzonitrile

Mimics 12, 13, and 14 of ROY

Mixed-Crystal Seeding and Suspended-Melt Crystallization not Limited to ROY

The ability of mixed-crystal seeding and suspended-melt crystallization to be used as methods of polymorphic screening is not limited to the demanding case of ROY. Mixed crystals containing both ROY and FuROY were also successfully used as seeds to induce suspended melts of FuROY to form a new polymorph Y in the form of single crystals that could be structurally analyzed by X-ray diffraction (Table 4). This observation is noteworthy because form Y of FuROY had not been detected in previous crystallizations under diverse conditions, including sublimation, cooling of melts, and evaporation of solutions in many different solvents. Polymorphs Y of FuROY and Y19 of ROY form a closely related isostructural pair, and either one can act as a heteroseed to induce the crystallization of the other.

No precedent exists in which mixed crystals containing a target compound and one or more other components have been prepared for subsequent use as seeds to increase polymorphic diversity and/or for conducting polymorphic screening. Without being bound by theory, the special power of mixed-crystal seeding is attributed to two primary factors: (1) The target compound is a significant component of mixed crystals, thereby predisposing them to act as effective seeds and conferring the established advantages of homoseeding as a way to induce crystallization; and (2) lattice distortions and stresses in mixed crystals caused by the simultaneous incorporation of the target compound and other components introduce structural alterations that appear to induce crystallization to occur in new ways, as when a heteroseed composed entirely of another compound or a different foreign surface is used to promote crystallization. Mixed-crystal seeding offers a new way to increase polymorphic diversity and/or to conduct polymorphic screening, in which the dual advantages of crystallization induced by homoseeds and by foreign surfaces are unexpectedly combined.

Ideal crystallization is a selective process that yields uniform periodic structures, but real crystals are never entirely defect-free, and they can sometimes include low levels of impurities that are fortuitously incorporated during growth of the crystal. Defective crystals of this type differ from mixed crystals designed for use as seeds in various important ways: (1) Impurities in imperfect crystals are normally present by accident, not introduced intentionally; (2) impurities incorporated during crystallizations do not usually constitute a substantial part of the overall composition; and (3) impurities present during the crystallization of a target compound do not typically have a structural relationship close enough to allow substantial replacement of one constituent by another. As a result, mixed-crystal seeding is not inherent in the normal process of crystallization. Evidence is provided by the failure of simultaneous crystallizations of ROY and FuROY to give new polymorphs of ROY, as well as by the results of countless crystallizations of ROY in various states of purity during the last two decades, which have never been reported to yield the PO13 and Y19 polymorphs in forms suitable for characterization by single-crystal X-ray diffraction.

Case Study II: Polymorphic Screening of Dibenzothiophene and Dibenzofuran

Dibenzothiophene (15) and dibenzofuran (16) have the same molecular relationship as ROY (1) and FuROY (2). In both pairs, the two molecules are identical except for the replacement of an atom of sulfur by an atom of oxygen.

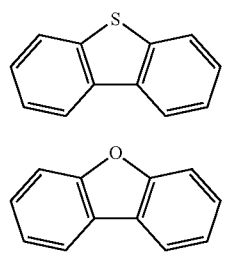

Both dibenzothiophene (DBT) and the corresponding furan (DBF) can be prepared as crystalline solids, and one structure has been reported for each compound. DBT is known to crystallize in the monoclinic space group P21/c, and DBF in the orthorhombic space group Pnma. Despite the close similarity of DBT and DBF, molecules in the two known crystal structures are arranged in distinctly different ways.

Although DBT and DBF crystallize differently, it is nevertheless possible to prepare mixed crystals containing both compounds in widely differing ratios. The structures of selected mixed crystals were determined by single-crystal X-ray diffraction, and the resulting data are compiled in Table 5. The primary component of the mixed crystals can be either DBT or DBF. In all cases shown, the mixed crystals have structures similar to those of pure DBF, even when DBT is the major component.

TABLE 5

Structural Data for Mixed Crystals of DBT and DBF, as Determined by Single-Crystal X-Ray Diffraction, and Other Selected Properties

| | form | | | |
|---|---|---|---|---|
| | Mixed DBT/DBF | Mixed DBT/DBF | Mixed DBT/DBF | Mixed DBT/DBF |
| description | colorless plates | colorless plates | colorless plates | colorless plates |
| ratio DBT:DBF[a] | 23:77 | 46:54 | 59:41 | 73:27 |
| crystal system | orthorhombic | orthorhombic | orthorhombic | orthorhombic |
| space group | Pnma | Pnma | Pnma | Pnma |
| a (Å) | 7.6368(4) | 7.7875(3) | 7.8867(5) | 7.9686(3) |
| b (Å) | 18.9566(13) | 18.9102(8) | 18.8866(12) | 18.8543(6) |
| c (Å) | 5.7980(4) | 5.8053(3) | 5.8042(4) | 5.8060(2) |
| α (deg) | 90 | 90 | 90 | 90 |

TABLE 5-continued

Structural Data for Mixed Crystals of DBT and DBF, as Determined by Single-Crystal X-Ray Diffraction, and Other Selected Properties

| | form | | | |
|---|---|---|---|---|
| | Mixed DBT/DBF | Mixed DBT/DBF | Mixed DBT/DBF | Mixed DBT/DBF |
| β (deg) | 90 | 90 | 90 | 90 |
| γ (deg) | 90 | 90 | 90 | 90 |
| V (Å$^3$) | 839.363 | 854.907 | 864.553 | 872.307 |
| Z | 4 | 4 | 4 | 4 |
| $\rho_{calc}$ (g · cm$^{-3}$) | 1.360 | 1.363 | 1.365 | 1.370 |
| T (K) | 100 | 100 | 100 | 100 |
| $R_1$, I > 2σ(I) | 0.0503 | 0.0365 | 0.0388 | 0.0319 |
| $wR_2$, I > 2σ(I) | 0.1433 | 0.0996 | 0.1065 | 0.0855 |
| GoF | 1.102 | 1.131 | 1.079 | 1.099 |

$^a$Ratios determined by crystallographic analysis and confirmed by $^1$H NMR spectroscopy.

The resulting library of mixed crystals can be used as seeds to screen for new polymorphs of DBT and DBF, using various methods of crystallization. In particular, DBT-rich mixed crystals that have the structure of DBF are promising seeds for inducing DBT to yield a new polymorph in which molecules are arranged as they are in orthorhombic Pnma crystals of DBF.

The pairs defined by ROY/FuROY and DBT/DBF both differ by replacement of an atom of sulfur by an atom of oxygen. Both pairs form mixed crystals with a wide range of compositions, even though the components have been noted to crystallize in different ways. Similar behavior is shown by many other sets of compounds that differ by related isosteric, isomeric, or quasi-isosteric substitutions. As a result, the formation of mixed crystals is broadly feasible, making mixed crystals readily available for use as seeds in polymorphic screening.

For example, anthracene (17), acridine (18), and phenazine (19) differ by the successive substitution of CH by N. Various polymorphs of the three compounds are known, but there are no reports of isostructural crystals, in which the molecular organization is the same. Despite the tendency to crystallize in different ways, anthracene and acridine are known to form mixed crystals with a range of compositions. Acridine and phenazine behave in the same way, and it is even possible to form mixed crystals containing all three compounds. This demonstrates that multiple sites in a target compound can be altered simultaneously without preventing the formation of mixed crystals. Moreover, the behavior of compounds 17-19 underscores the broad scope for making mixed crystals and using them in polymorphic screening.

The ability of ROY and fluorinated analog 8 to form mixed crystals confirms that substitution of H by F is another effective way to produce seeds for use in polymorphic screening. The formation of mixed crystals by many other compounds and their fluorinated structural analogs has been noted, such as in the case of benzoic acid and various fluorine-substituted derivatives.

The feasibility of making mixed crystals composed of a target compound and its constitutional isomers and quasi-isosteric analogs is well established. For example, simultaneous crystallizations of L-leucine, L-isoleucine, and L-valine from aqueous solution induced by the addition of isopropanol as antisolvent yield mixed crystals containing L-leucine/L-isoleucine, L-leucine/L-valine, and L-isoleucine/L-valine in varying ratios. In addition, mixed crystals composed of a target compound and its stereoisomers are also well known, as exemplified by the case of (S)-timolol maleate, which is used to treat hypertension and glaucoma. The maleate salt forms a continuous series of mixed crystals with the salt of its (R)-enantiomer.

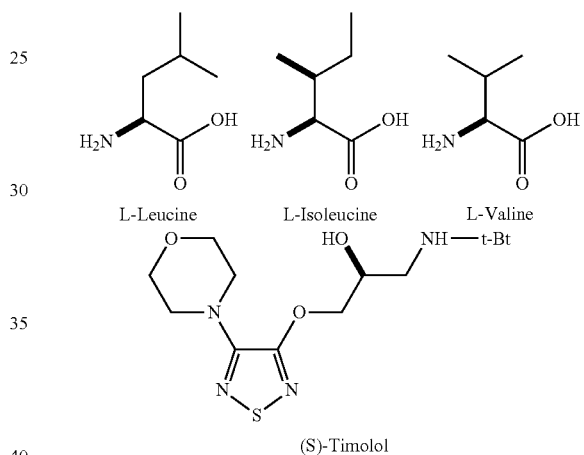

It is also possible to make mixed crystals of ionic compounds in which the cation or anion is replaced in part by a structurally analogous ion. For example, mixed crystals of salts of isoorotic acid containing both Na$^+$ and Li$^+$ can be prepared, showing that cationic substitution is feasible. Similarly, anionic substitution can also be achieved, as illustrated by the formation of mixed ionic crystals containing protonated (±)-4'-methylmethcathinone as cation and variable ratios of Cl$^-$ and Br$^-$ as anions.

In such ways, diverse structural analogs can be obtained for any compound of interest and used to make libraries of mixed crystals, which can in turn be employed in polymorphic screening.

The utility of mixed crystals in polymorphic screening is not limited to cases in which the target compound has already been prepared in one or more crystalline forms, and additional polymorphs are sought. Mixed crystals can also be used in screening when the compound of interest has not yet been made in crystalline form. In such cases, screening can be carried out using mixed crystals containing the target compound and one or more structural analogs that crystallize more readily.

Examples and Synthetic Protocols

All reagents and solvents were obtained from commercial sources and used without further purification unless otherwise indicated.

2-Amino-5-methyl-4,5-dihydrofuran-3-carbonitrile (4). Sodium hydride (12.5 g, 60% w/w in oil, 315 mmol) was added slowly under $N_2$ to stirred dry EtOH (180 mL) at 0° C. A solution of malononitrile (18.8 g, 285 mmol) in EtOH (20 mL) was then added, followed by the dropwise addition of a solution of propylene oxide (16.6 g, 286 mmol) in EtOH (50 mL). The resulting mixture was kept at 0° C. for an additional 10 min, the cooling bath was removed, and the mixture was stirred for 2 h at 25° C. Volatiles were removed by evaporation under reduced pressure, the residual oil was poured into ice-cold brine (130 mL), and the mixture was stirred. The resulting precipitate was separated by filtration, washed three times with ice-cold brine, and dissolved in acetone. The solution was dried with $Na_2SO_4$ and filtered. Volatiles were removed from the filtrate by evaporation under reduced pressure, and the solid residue was stirred with hexane, separated by filtration, washed three times with hexane, and dried under reduced pressure to afford 2-amino-5-methyl-4,5-dihydrofuran-3-carbonitrile (4) as a colorless solid (16.4 g, 132 mmol, 46%). The solid must be stored under an inert atmosphere to avoid decomposition: mp 101-102° C. (lit. mp 101-102° C.); $^1$H NMR (400 MHz, $CDCl_3$) δ 4.84-4.78 (m, 1H), 4.54 (bs, 2H), 2.99 (dd, $^2J$=11.9 Hz, $^3J$=9.1 Hz, 1H), 2.49 (dd, $^2J$=11.9 Hz, $^3J$=7.1 Hz, 1H), 1.39 (d, $^3J$=6.3 Hz, 3H); $^{13}$C NMR (100 MHz, $CDCl_3$) δ 167.1, 119.6, 80.6, 51.3, 36.2, 21.5.

N-(3-Cyano-5-methyl-4,5-dihydrofuran-2-yl)-4-nitrobenzamide (5). Solid 2-amino-5-methyl-4,5-dihydrofuran-3-carbonitrile (4; 17.1 g, 138 mmol) was mixed with solid 4-nitrobenzoyl chloride (30.6 g, 165 mmol), and the mixture of solids was added to preheated dry pyridine (300 mL) at 50° C. with strong stirring. After 15 min, a $^1$H NMR spectrum was recorded, and 85% conversion was observed. More 4-nitrobenzoyl chloride (5.11 g, 27.5 mmol) was added, and stirring at 50° C. was continued for 15 min. The mixture was then allowed to cool to 25° C., and water (400 mL) was added with vigorous stirring. The resulting yellow precipitate was separated by filtration, washed three times with water (250 mL), and dried under reduced pressure to afford the desired N-(3-cyano-5-methyl-4,5-dihydrofuran-2-yl)-4-nitrobenzamide (5; 28.8 g, 105 mmol, 76%): mp 200-202° C.; $^1$H NMR (400 MHz, DMSO-$d_6$) δ 11.47 (s, 1H), 8.35 (m, 2H), 8.15 (m, 2H), 5.00-4.91 (m, 1H), 3.15 (dd, $^2J$=13.5 Hz, $^3J$=9.6 Hz, 1H), 2.63 (dd, $^2J$=13.5 Hz, $^3J$=7.7 Hz, 1H), 1.40 (d, $^3J$=6.2 Hz, 3H); $^{13}$C NMR (100 MHz, DMSO-$d_6$) δ 163.1, 156.6, 149.7, 137.8, 129.8, 123.6, 116.1, 78.6, 69.0, 36.8, 20.9; HRMS (ESI-TOF) m/z $[M+NH_4]^+$ calcd for $C_{13}H_{15}N_4O_4$ 291.10878, found 291.10849.

N-(3-Cyano-5-methylfuran-2-yl)-4-nitrobenzamide (6). Under $N_2$, 2,3-dichloro-5,6-dicyano-1,4-benzoquinone (0.506 g, 2.23 mmol) was added to dry DMF (7.5 mL) preheated to 135° C., followed by N-(3-cyano-5-methyl-4,5-dihydrofuran-2-yl)-4-nitrobenzamide (5; 0.508 g, 1.86 mmol). After 20 min, the mixture was cooled to 25° C., and water (20 mL) was added with stirring. The resulting precipitate was separated by filtration, washed four times with MeOH, and dried under vacuum to afford the desired N-(3-cyano-5-methylfuran-2-yl)-4-nitrobenzamide (6) as a yellow-brown solid (0.398 g, 1.47 mmol, 79%): mp 204° C.; $^1$H NMR (400 MHz, DMSO-$d_6$) δ 11.86 (s, 1H), 8.40 (m, 2H), 8.22 (m, 2H), 6.57 (s, 1H), 2.30 (s, 3H); $^{13}$C NMR (100 MHz, DMSO-$d_6$) δ 163.1, 149.8, 149.7, 148.3, 137.7, 129.6, 123.8, 113.4, 107.7, 86.1, 12.8; HRMS (ESI-TOF) m/z $[M+NH_4]^+$ calcd for $C_{13}H_{13}N_4O_4$ 289.09313, found 289.09297.

(Z)—N-(3-Cyano-5-methylfuran-2-yl)-4-nitrobenzimidoyl chloride (7). Under $N_2$, a solution of dry pyridine (0.064 g, 0.81 mmol) in dry dioxane (4 mL) was quickly added to a solid mixture of PCl5 (0.537 g, 2.57 mmol) and N-(3-cyano methylfuran-2-yl)-4-nitrobenzamide (6; 0.200 g, 0.737 mmol). The resulting mixture was stirred, heated at reflux for 15 min, and cooled to 50° C. MeOH was then added until solids disappeared, and bubbling stopped. Volatiles were removed from the mixture by evaporation under reduced pressure. The residue of brown solid was mixed with enough MeOH to form a slurry, and the solid phase was separated by filtration and washed three times with a small amount of MeOH to afford (Z)—N-(3-cyano-5-methylfuran-2-yl)-4-nitrobenzimidoyl chloride (7) as a yellow solid (0.121 g, 0.418 mmol, 57%). Yields were found to be somewhat lower when the synthesis is carried out on a larger scale. The compound is hydrolyzed readily by contact with moisture to give the starting amide 5, so it was typically used without further purification. However, a sample of analytical purity could be prepared in the form of yellow needles by crystallization from boiling MeCN: mp 189° C.; $^1$H NMR (400 MHz, DMSO-$d_6$) δ 8.42 (m, 2H), 8.34 (m, 2H), 6.87 (s, 1H), 2.42 (s, 3H). The identity of the intermediate was further confirmed by using X-ray diffraction to determine the structure of the crystals.

2-Amino-5-methylfuran-3-carbonitrile (3). Quinoline (4.00 g, 31.0 mmol) was added to a mixture of (Z)—N-(3-cyano-5-methylfuran-2-yl)-4-nitrobenzimidoyl chloride (7; 3.60 g, 12.4 mmol) and ethylene glycol (55 mL). The resulting suspension was stirred and heated at 135° C. until no solid remained (3 min in a microwave reactor), and the resulting mixture was diluted with an equal volume of water. The aqueous mixture was extracted three times with EtOAc, and the combined extracts were dried with $Na_2SO_4$. Volatiles were removed from the filtered extracts by evaporation under reduced pressure. Silica and EtOAc were added to the oily residue, the suspension was stirred briefly, volatiles were removed under reduced pressure, and the resulting yellow-brown powder was added to a column prepared for flash chromatography (silica). Separation was enhanced by using a column longer than those normally used for purifications on a similar scale, with larger amounts of silica. Elution with 2:3 $Et_2O$/toluene yielded fractions from which a yellow solid mixed with brown oil was obtained by evaporation of solvent under reduced pressure. The desired product was extracted by swirling the mixture with boiling hexane and decanting the extracts, which left the brown oil behind. This process was repeated 4-6 times until extraction was complete. Volatiles were removed from the combined extracts by evaporation under reduced pressure to give 2-amino-5-methylfuran-3-carbonitrile (3; 0.995 g, 8.15 mmol, 66%) in the form of pale yellow needles. Yields are somewhat lower when the synthesis is carried out on a smaller scale. The compound is unstable when heated or dissolved, but it can be stored in the solid form at 25° C. for over a week: mp 80° C.; $^1$H NMR (400 MHz, CDCl$_3$) δ 5.87 (q, $^4$J=1.2 Hz, 1H), 4.57 (bs, 2H), 2.15 (d, $^4$J=1.2 Hz, 3H); $^{13}$C NMR (100 MHz, CDCl$_3$) δ 161.3, 143.2, 115.7, 105.7, 69.5, 13.0; HRMS (ESI-TOF) m/z [M+H]$^+$ calcd for C$_6$H$_7$N$_2$O 123.05531, found 123.05529.

5-Methyl-2-[(2-nitrophenyl)amino]furan-3-carbonitrile (2) (FuROY). A solution of 2-amino-5-methylfuran-3-carbonitrile (3; 0.995 g, 8.15 mmol), 1-bromo-2-nitrobenzene (1.64 g, 8.13 mmol), K$_3$PO$_4$ (2.07 g, 9.73 mmol), phenylboronic acid (0.196 g, 1.60 mmol), and JohnPhos (0.486 g, 1.60 mmol) in dry dioxane (15 mL) was sparged with N$_2$ in an ultrasonic bath for 3 min. Pd(OAc)$_2$ (0.182 g, 0.800 mmol) was then added under N$_2$, and the mixture was heated at 95° C. for 20 min. Silica and EtOAc were added, the mixture was stirred briefly, and volatiles were removed by evaporation under reduced pressure. The resulting orange powder was added to a column prepared for flash chromatography (silica). Separation was enhanced by using a short column with a moderate amount of silica. Elution with 1:4 THF/hexane yielded fractions from which a red solid mixed with oil was obtained by evaporation of solvent under reduced pressure. The solid was scraped from the walls of the flask used for evaporation, water was added, and the mixture was stirred in an ultrasonic bath for 5 min. The red solid was then separated by filtration, washed with water, and dried under reduced pressure to afford 5-methyl-2-[(2-nitrophenyl)amino]furan-3-carbonitrile (2; 1.53 g, 6.27 mmol, 77%): $^1$H NMR (400 MHz, CDCl$_3$) δ 9.85 (bs, 1H), 8.25 (dd, $^3$J=8.5 Hz, $^4$J=1.5 Hz, 1H), 7.57 (ddd, $^3$J=8.5 Hz, $^3$J=7.2 Hz, $^4$J=1.5 Hz, 1H), 7.31 (dd, $^3$J=8.5 Hz, $^4$J=1.2 Hz, 1H), 7.03 (ddd, $^3$J=8.5 Hz, $^3$J=7.2 Hz, $^4$J=1.2 Hz, 1H), 6.19 (m, 1H), 2.32 (d, $^4$J=1.1 Hz, 3H); $^{13}$C NMR (100 MHz, CDCl$_3$) δ 152.2, 148.5, 138.3, 136.3, 134.6, 126.7, 120.9, 117.5, 113.2, 107.2, 84.7, 13.5; HRMS (ESI-TOF) m/z [M+NH$_4$]$^+$ calcd for C$_{12}$H$_{13}$N$_4$O$_3$ 261.09822, found 261.09852. FuROY was observed to crystallize in at least five different forms: Polymorphs OY (mp 102° C., $v_{CN}$=2234 cm$^{-1}$, orange-yellow prisms), R (mp 93° C., $v_{CN}$=2212 cm$^{-1}$, red rectangles), OR ($v_{CN}$=2215 cm$^{-1}$, orange-red needles), and Y (mp 88° C., $v_{CN}$=2231 cm$^{-1}$, yellow needles), as well as a solvate with dioxane (mp 65° C., $v_{CN}$=2225 cm$^{-1}$, orange needles).

Preparation of Mixed-Crystal Seeds for Inducing the Formation of Single Crystals of the PO13 Polymorph of ROY. ROY and FuROY were mixed in a 2:3 molar ratio and dissolved in a 1:1 mixture of EtOH and hexane (4.0 mL) to create a solution of combined concentration 0.012 M. Slow evaporation of solvent yielded orange-yellow needles of approximate composition 40% ROY and 60% FuROY as analyzed by X-ray diffraction and $^1$H NMR spectroscopy. The Raman spectrum contains two bands corresponding to CN stretching ($v_{CN}$=2224 and 2232 cm$^{-1}$). The resulting mixed-crystalline solid was used as described below to seed crystallization of the PO13 polymorph of ROY in the form of single crystals suitable for structural analysis by X-ray diffraction.

Mixed-Crystal Seeding to Induce the Formation of Single Crystals of the PO13 Polymorph of ROY. Mixed crystals of ROY and FuROY prepared as described above proved to seed the crystallization of either ROY or FuROY. When the crystals were used to seed a supercooled melt of ROY, a uniform crystalline sample of the PO13 polymorph of ROY was produced. The resulting solid was used to seed the crystallization of ROY from supersaturated solutions in either anhydrous EtOH or 1:1 ethyl acetate/hexane. This provided polymorph PO13 in the form of pale orange needles suitable for structural analysis by X-ray diffraction.

Polymorph PO13 was found to melt at 100° C. and was characterized by Raman spectroscopy, single-crystal X-ray diffraction, and DSC. The solid is easily transformed into the more stable ON or Y polymorphs of ROY. Transformation can be induced by heating, especially above 90° C., or by allowing crystals to remain in contact with mother liquors at 25° C. However, a sample of polymorph PO13 remained unchanged for many weeks when kept at 25° C. as a dry solid.

Preparation of Mixed-Crystal Seeds for Inducing the Formation of Single Crystals of the Y19 Polymorph of ROY. ROY and FuROY were mixed in a 2:3 molar ratio and dissolved in acetone (4.0 mL) to create a solution of combined concentration 0.012 M. Slow evaporation of solvent to dryness yielded a bright orange crystalline solid of approximate composition 38% ROY and 62% FuROY as analyzed by X-ray diffraction and $^1$H NMR spectroscopy. The resulting mixed-crystalline solid was used as described below to seed crystallization of the Y19 polymorph of ROY in the form of single crystals suitable for structural analysis by X-ray diffraction.

Mixed-Crystal Seeding to Induce the Formation of Single Crystals of the Y19 Polymorph of ROY. Mixed crystals of ROY and FuROY were prepared as described above and used to seed a supercooled melt of ROY at 65° C. This yielded a yellow polycrystalline solid corresponding to the Y19 polymorph of ROY. To produce single crystals of the polymorph, a small amount of ROY was melted, and a droplet was transferred by pipette into vigorously stirred water at 70° C. A small seed of mixed-crystalline ROY:FuROY was quickly inserted into the stirred suspension of molten ROY, triggering crystallization. Polymorph Y19 was produced as a polycrystalline solid, including small yellow needles. The needles were separated by hand and dried with absorbent paper.

The melting point of the crystals could not be measured in the normal way due to rapid transformation into the more stable polymorph Y of ROY. This transformation was also observed to occur when the crystals were subjected to gentle pressure by grinding, exposed to various organic solvents, or even stored at 25° C. for more than a few hours. Characterization of polymorph Y19 was based unambiguously on the Raman spectrum and structural analysis of single crystals by X-ray diffraction.

Preparation of Mixed-Crystal Seeds Containing Dibenzothiophene (DBT) and Dibenzofuran (DBF) for Polymorphic Screening. Weighed amounts of DBT and DBF were combined in variable ratios to create mixtures. The mixtures (approximately 100 mg in combined weight) were placed in glass vials, and MeOH (5 mL) was added. The solvent was warmed to its boiling point to ensure dissolution of the solids, the vials were closed with a layer of aluminum foil, and the foil caps were pierced once with a needle to allow slow evaporation of the solvent, which required 1-2 weeks. Crystals were visible after about one-half of the solvent had evaporated. Examination of selected crystals by single-crystal X-ray diffraction confirmed that the samples were homogeneous and contained both DBT and DBF in ratios similar to those present in the initial solutions.

Although the invention has been illustrated and described with respect to one or more implementations, equivalent alterations and modifications will occur to others skilled in the art upon the reading and understanding of this specification. In addition, while a particular feature of the invention may have been disclosed with respect to only one of several implementations, such a feature may be combined with one or more other features of the other implementations as may be desired and advantageous for any given or particular application.

Accordingly, it is understood that the examples and embodiments described herein are for illustrative purposes only and that various modifications or changes in light thereof will be suggested to persons skilled in the art and are to be included within the spirit and purview of this application and scope of the appended claims. Any publication, document, patent, patent application, or publication referred to herein should be construed as incorporated by reference each in their entirety for all purposes.

REFERENCES

1. Bernstein, J. *Polymorphism in Molecular Crystals*; Oxford University Press: New York, 2002.
2. Nyman, J. & Day, G. M. Static and Lattice Vibrational Energy Differences Between Polymorphs. *Cryst Eng Comm* 17, 5154-5165 (2015).
3. Price, S. L. Control and Prediction of the Organic Solid State: A Challenge to Theory and Experiment. *Proc. R. Soc. A* 474, 20180351 (2018).
4. Price, S. L. Predicting Crystal Structures of Organic Compounds. *Chem. Soc. Rev.* 43, 2098-2111 (2014).
5. Thakur, T. S., Dubey, R. & Desiraju, G. R. Crystal Structure and Prediction. *Annu. Rev. Phys. Chem.* 66, 21-42 (2015).
6. McCrone, W. C. In *Polymorphism in Physics and Chemistry of the Organic Solid State*. Fox, D.; Labes, M. M.; Weissenberg, A., eds. Interscience, New York, 1965, vol. II, pp. 725-767.
7. Kersten, K., Kaur, R. & Matzger, A. Survey and Analysis of Crystal Polymorphism in Organic Structures. *IUCrJ* 5, 124-129 (2018).
8. Cruz-Cabeza, A. J., Reutzel-Edens, S. M. & Bernstein, J. Facts and Fictions about Polymorphism. *Chem. Soc. Rev.* 44, 8619-8635 (2015).
9. Lopez-Mejias, V., Kampf, J. W. & Matzger, A. J. Non-amorphism in Flufenamic Acid and a New Record for a Polymorphic Structure with Solved Structures. *J. Am. Chem. Soc.* 134, 9872-9875 (2012).
10. Funnell, N. P., Bull, C. L., Ridley, C. J. & Capelli, S. Structural Behaviour of OP-ROY at Extreme Conditions. *Cryst Eng Comm* 21, 4474-4483 (2019).
11. Nyman, J., Yu, L. & Reutzel-Edens, S. M. Accuracy and Reproducibility in Crystal Structure Prediction: The Curious Case of ROY. *Cryst Eng Comm* 21,
12. Ziemecka, I. et al. Polymorph Selection of ROY by Flow-Driven Crystallization. *Crystals* 9, 351 (2019).
13. Gushurst, K. S., Nyman, J. & Boerrigter, S. X. M. The PO13 Crystal Structure of ROY. *Cryst Eng Comm* 21, 1363-1368 (2019).
14. Tan, M. et al. ROY Revisited, Again: The Eighth Solved Structure. *Faraday Discuss.* 211, 477-491 (2018).
15. Thomas, S. P. & Spackman, M. A. The Polymorphs of ROY: A Computational Study of Lattice Energies and Conformational Energy Differences. *Aust. J. Chem.* 71, 279-284 (2018).
16. Habgood, M.; Sugden, I. J.; Kazantsev, A. V.; Adjiman, C. S.; Pantelides, C. C. Efficient Handling of Molecular Flexibility in Ab Initio Generation of Crystal Structures. *J. Chem. Theory. Comput.* 11, 1957-1969 (2015).
17. Gnutzmann, T., Thi, Y. N., Rademann, K. & Emmerling, F. Solvent-Triggered Crystallization of Polymorphs Studied in Situ. *Cryst. Growth. Des.* 14, 6445-6450 (2014).
18. Vasileiadis, M., Kazantsev, A. V., Karamertzanis, P. G., Adjiman, C. S. & Pantelides, C. C. The Polymorphs of ROY: Application of a Systematic Crystal Structure Prediction Technique. *Acta Crystallogr. B*68, 677-685 (2012).
19. Yu, L. Polymorphism in Molecular Solids: An Extraordinary System of Red, Orange, and Yellow Crystals. *Acc. Chem. Res.* 43, 1257-1266 (2010).
20. Li, T., Ayers, P. W., Liu, S., Swadley, M. J. & Aubrey-Medendorp, C. Crystallization Force—A Density Functional Theory Concept for Revealing Intermolecular Interactions and Molecular Packing in Organic Crystals. *Chem. Eur. J.* 15, 361-371 (2009).
21. Singh, A., Lee, I. S. & Myerson, A. S. Concomitant Crystallization of ROY on Patterned Substrates: Using a High Throughput Method to Improve the Chances of Crystallization of Different Polymorphs. *Cryst. Growth Des.* 9, 1182-1185 (2009).
22. McKinnon, J. J., Fabbiani, F. P. A. & Spackman, M. A. Comparison of Polymorphic Molecular Crystal Structures through Hirshfeld Surface Analysis. *Cryst. Growth Des.* 7, 755-769 (2007).
23. Chen, S., Xi, H. & Yu, L. Cross-Nucleation between ROY Polymorphs. *J. Am. Chem. Soc.* 127, 17439-17444 (2005).
24. Chen, S., Guzei, I. A. & Yu, L. New Polymorphs of ROY and New Record for Coexisting Polymorphs of Solved Structures. *J. Am. Chem. Soc.* 127, 9881-9885 (2005).
25. Dunitz, J. D. & Gavezzotti, A. Toward a Quantitative Description of Crystal Packing in Terms of Molecular Pairs: Application to the Hexamorphic Crystal System, 5-Methyl-2-[(2-nitrophenyl)amino]-3-thiophenecarbonitrile. *Cryst. Growth Des.* 5, 2180-2189 (2005).
26. Hilden, J. L. et al. Capillary Precipitation of a Highly Polymorphic Organic Compound. *Cryst. Growth Des.* 3, 921-926 (2003).
27. Yu, L. Color Changes Caused by Conformational Polymorphism: Optical-Crystallography, Single-Crystal Spectroscopy, and Computational Chemistry. *J. Phys. Chem. A* 106, 544-550 (2002).
28. Yu, L. et al. Thermochemistry and Conformational Polymorphism of a Hexamorphic Crystal System. *J. Am. Chem. Soc.* 122, 585-591 (2000).
29. Borchardt, T. B. Ph. D. Thesis, Purdue University, West Lafayette, IN, 1997.
30. Bhardwaj, R. M. et al. A Prolific Solvate Former, Galunisertib, under the Pressure of Crystal Structure Prediction, Produces Ten Diverse Polymorphs. *J. Am. Chem. Soc.* 141, 13887-13897 (2019).
31. Zeidan, T. A. et al. An Unprecedented Case of Dodecamorphism: The Twelfth Polymorph of Aripiprazole Formed by Seeding with its Active Metabolite. *Cryst Eng Comm* 18, 1486-1488 (2016).
32. *Crystallization: Basic Concepts and Industrial Applications*; Beckmann, W., Ed.; Wiley-VCH Verlag: Weinheim, 2013.
33. Tung, H.-H., Paul, E. L., Midler, M. & McCauley, J. A. *Crystallization of Organic Compounds: An Industrial Perspective*; John Wiley & Sons: Hoboken, 2009.
34. Mullin, J. W. *Crystallization*; Butterworth-Heinemann: Oxford, 2001.
35. Davey, R. J., Schroeder, S. L. M. & ter Horst, J. H. Nucleation of Organic Crystals—A Molecular Perspective. *Angew. Chem. Int. Ed.* 52, 2166-2179 (2013).
36. Erdemir, D., Lee, A. Y. & Myerson, A. S. Nucleation of Crystals from Solution: Classical and Two-Step Models. *Acc. Chem. Res.* 42, 621-629 (2009).

37. Vekilov, P. G. Nucleation. *Cryst. Growth Des.* 10, 5007-5019 (2010).
38. Pfund, L. A. & Matzger, A. J. Towards Exhaustive and Automated High-Throughput Screening for Crystalline Polymorphs. *ACS Comb. Sci.* 16, 309-313 (2014).
39. Price, C. P., Grzesiak, A. L. & Matzger, A. J. Crystalline Polymorph Selection and Discovery with Polymer Heteronuclei. *J. Am. Chem. Soc.* 127, 5512-5517 (2005).
40. Olmsted, B. K. & Ward, M. D. The Role of Chemical Interactions and Epitaxy during Nucleation of Organic Crystals on Crystalline Substrates. *Cryst Eng Comm* 13, 1070-1073 (2011).
41. Chadwick, K., Myerson, A. & Trout, B. Polymorphic Control by Heterogeneous Nucleation—A New Method for Selecting Crystalline Substrates. *Cryst Eng Comm* 13, 6625-6627 (2011).
42. Lang, M., Grzesiak, A. L. & Matzger, A. J. The Use of Polymer Heteronuclei for Crystalline Polymorph Selection. *J. Am. Chem. Soc.* 124, 14834-14835 (2002).
43. Mitchell, C. A., Yu, L. & Ward, M. D. Selective Nucleation and Discovery of Organic Polymorphs through Epitaxy with Single Crystal Substrates. *J. Am. Chem. Soc.* 123, 10830-10839 (2001).
44. Islam, M. M. & Kuroda, Y. A Hetero-Micro-Seeding Strategy for Readily Crystallizing Closely Related Protein Variants. *Biochem. Biophys. Res. Commun.* 493, 504-508 (2017).
45. Abuhammad, A. et al. "To Cross-Seed or Not To Cross-Seed": A Pilot Study Using Metallo-β-lactamases. *Cryst. Growth Des.* 17, 913-924 (2017).
46. Srirambhatla, V. K., Guo, R., Price, S. L. & Florence, A. J. Isomorphous Template Induced Crystallisation: A Robust Method for the Targeted Crystallisation of Computationally Predicted Metastable Polymorphs. *Chem. Commun.* 52, 7384-7386 (2016).
47. Bučar, D.-K. et al. The Curious Case of (Caffeine)·(Benzoic Acid): How Heteronuclear Seeding Allowed the Formation of an Elusive Cocrystal. *Chem. Sci.* 4, 4417-4425 (2013).
48. Zencirci, N., Gelbrich, T., Kahlenberg, V. & Griesser, U. J. Crystallization of Metastable Polymorphs of Phenobarbital by Isomorphic Seeding. *Cryst. Growth Des.* 9, 3444-3456 (2009).
49. Friščič, T. & MacGillivray, L. R. Engineering Cocrystal and Polymorph Architecture via Pseudoseeding. *Chem. Commun.* 45, 773-775 (2009).
50. Quai, M. et al. 5-Hydroxy-2H-pyrrol-2-ones and Not 2-Aminofurans are the Cycloaddition Products between Alkyl Isocyanides and Benzyliden-1,3-diketones. *Tetrahedron Lett.* 45, 1413-1416 (2004).
51. Matsuda, T., Yamagata, K., Tomioka, Y. & Yamazaki, M. Studies on Heterocyclic Enaminonitriles. VI. Synthesis of 2-Amino-3-cyano-4,5-dihydrofurans. *Chem. Pharm. Bull.* 33, 937-943 (1985).
52. Spaggiari, A., Blaszczak, L. C. & Prati, F. Low-Temperature Deacylation of N-Monosubstituted Amides. *Org. Lett.* 6, 3885-3888 (2004).
53. Yamanaka, H. et al. Studies on p-Lactam Antibiotics. IX. Synthesis and Biological Activity of a New Orally Active Cephalosporin, Cefixime (FK027). *J. Antibiot.* 38, 1738-1751 (1985).
54. Bakavoli, M., Rahimizadeh, M. & Gordi, Z. One-Pot Synthesis of Substituted 2-Amino-3-furonitriles. *J. Chem. Res.* 564-565 (2008).
55. Jun, J.-G. Regioselective Synthesis of 2-Amino-3-cyanofuran Derivatives and Its Guanidine Cyclization Reaction. *Bull. Korean Chem. Soc.* 17, 676-678 (1996).
56. Li, H., Stowell, J. G., Borchardt, T. B. & Byrn, S. R. Synthesis, Conformational Polymorphism, and Construction of a G-T Diagram of 2-[(2-Nitrophenyl)amino]-3-thiophenecarbonitrile. *Cryst. Growth Des.* 6, 2469-2474 (2006).
57. He, X., Griesser, U. J., Stowell, J. G., Borchardt, T. B. & Byrn, S. R. Conformational Color Polymorphism and Control of Crystallization of 5-Methyl-2-[(4-methyl-2-nitrophenyl)amino]-3-thiophenecarbonitrile. *J. Pharm. Sci.* 90, 371-388 (2001).
58. Uzoh, O. G., Cruz-Cabeza, A. J. & Price, S. L. Is the Fenamate Group a Polymorphophore? Contrasting the Crystal Energy Landscapes of Fenamic and Tolfenamic Acids. *Cryst. Growth Des.* 12, 4230-4239 (2012).
59. Lutker, K. M., Tolstyka, Z. P. & Matzger, A. J. Investigation of a Privileged Polymorphic Motif: A Dimeric ROY Derivative. *Cryst. Growth Des.* 8, 136-139 (2008).
60. Heskia, A., Maris, T. & Wuest, J. D. Foiling Normal Patterns of Crystallization by Design. Polymorphism of Phosphangulene Chalcogenides. *Cryst. Growth Des.* 19, 5390-5406 (2019).
61. Weissbuch, I., Leiserowitz, L. & Lahav, M. "Tailor-Made" and Charge-Transfer Auxiliaries for the Control of the Crystal Polymorphism of Glycine. *Adv. Mater.*
62. For a discussion of mixed crystals, solid solutions, eutectics, and cocrystals, see: Cherukuvada, S. & Nangia, A. Eutectics as Improved Pharmaceutical Materials: Design, Properties and Characterization. *Chem. Commun.* 50, 906-923 (2014).
63. Kitaigorodsky, A. I. *Mixed Crystals*; Springer-Verlag: Berlin, 1984.
64. Bruni, G. Solid Solutions. *Chem. Rev.* 1, 345-375 (1925).
65. Lusi, M. Engineering Crystal Properties through Solid Solutions. *Cryst. Growth Des.* 18, 3704-3712 (2018).
66. Cruz-Cabeza, A. J., Lestari, M. & Lusi, M. Cocrystals Help Break the "Rules" of Isostructurality: Solid Solutions and Polymorphism in the Malic/Tartaric Acid System. *Cryst. Growth Des.* 18, 855-863 (2018).
67. Romasanta, A. K. S., Braga, D., Duarteb, M. T. & Grepioni, F. How Similar is Similar? Exploring the Binary and Ternary Solid Solution Landscapes of p-Methyl/Chloro/Bromo-Benzyl Alcohols. *Cryst Eng Comm* 19, 653-660 (2017).
68. Schur, E., Nauha, E., Lusi, M. & Bernstein, J. Kitaigorodsky Revisited: Polymorphism and Mixed Crystals of Acridine/Phenazine. *Chem. Eur. J.* 21, 1735-1742 (2015).
69. Lusi, M., Vitorica-Yrezabal, I. J. & Zaworotko, M. J. Expanding the Scope of Molecular Mixed Crystals Enabled by Three Component Solid Solutions. *Cryst. Growth. Des.* 15, 4098-4103 (2015).
70. Braga, D. et al. Hetero-Seeding and Solid Mixture to Obtain New Crystalline Forms. *Chem. Eur. J.* 15, 1508-1515 (2009).
71. Oliveira, M. A., Peterson, M. L. & Klein, D. Continuously Substituted Solid Solutions of Organic Co-Crystals. *Cryst. Growth Des.* 8, 4487-4493 (2008).
72. Myasnikova, R. M. Lattice Distortions in Organic Solid Solutions. *Mol. Cryst. Liq. Cryst.* 90, 195-204 (1982).
73. Cartner, A., Kettle, S. F. A., Rakshit, S. & Willis, D. Part XXV. —Volume-Modulated Frequency Changes in the Raman Spectra of Mixed Hexacarbonyl Crystals, $M_xM'_{1-x}(CO)_6$, M, M'=Cr, Mo, W. *J. Chem. Soc., Faraday Trans. 2* 78, 369-377 (1982).
74. Gao, M., Shi, Z. Wang, M. & Zheng, Q.-H. [$^{11}$C] Olanzapine, Radiosynthesis and Lipophilicity of a New Potential PET 5-HT$_2$ and D$_2$ Receptor Radioligand. *Bioorg. Med. Chem. Lett.* 23, 1953-1956 (2013).

75. Raza, S A. et al. Rapid Continuous Antisolvent Crystallization of Multicomponent Systems. *Cryst. Growth Des.* 18, 210-218 (2018).
76. Lestari, M. & Lusi, M. A Mixed Molecular Salt of Lithium and Sodium Breaks the Hume-Rothery Rules for Solid Solutions. *Chem. Commun.* 55, 2297-2300 (2019).
77. Delori, A. et al. Drug Solid Solutions—A Method for Tuning Phase Transformations. *Cryst Eng Comm* 16, 5827-5831 (2014).
78. Bredikhin, A. A., Bredikhina, Z. A., Zakharychev, D. V., Gubaidullin, A. T. & Fayzullin, R. R. Chiral Drug Timolol Maleate as a Continuous Solid Solution: Thermochemical and Single Crystal X-Ray Evidence. *Cryst Eng Comm* 14,
79. Ganduri, R., Cherukuvada, S., Sarkar, S. & Guru Row, T. N. Manifestation of Cocrystals and Eutectics Among Structurally Related Molecules: Towards Understanding the Factors that Control Their Formation. *Cryst Eng Comm* 19, 1123-1132 (2017).
80. Chakraborty, S. & Desiraju, G. R. C—H F Hydrogen Bonds in Solid Solutions of Benzoic Acid and 4-Fluorobenzoic Acid. *Cryst. Growth Des.* 18, 3607-3615 (2018).
81. Braun, D. E. & Griesser, U. J. Prediction and Experimental Validation of Solid Solutions and Isopolymorphs of Cytosine/5-Flucytosine. *Cryst Eng Comm* 19, 3566-3572 (2017).
82. Braun, D. E., Kahlenberg, V. & Griesser, U. J. Experimental and Computational Hydrate Screening: Cytosine, 5-Flucytosine, and Their Solid Solution. *Cryst. Growth Des.* 17, 4347-4364 (2017).
83. Huang, J., Chen, S., Guzei, I. A. & Yu, L. Discovery of a Solid Solution of Enantiomers in a Racemate-Forming System by Seeding. *J. Am. Chem. Soc.* 128, 11985-11992 (2006).
84. Lusi, M. A Rough Guide to Molecular Solid Solutions: Design, Synthesis and Characterization of Mixed Crystals. *Cryst Eng Comm* 20, 7042-7052 (2018).
85. Shi, C., Zhang, X., Yu, C.-H., Yao, Y.-F. & Zhang, W. Geometric Isotope Effect of Deuteration in a Hydrogen-Bonded Host-Guest Crystal. *Nat. Commun.* 9, 481 (2018).
86. Merz, K. & Kupka, A. Deuterium Perturbs the Molecular Arrangement in the Solid State. *Cryst. Growth Des.* 15, 1553-1558 (2015).
87. Crawford, S. et al. Isotopic Polymorphism in Pyridine. *Angew. Chem. Int. Ed.* 48, 755-757 (2009).
88. Zhou, J., Kye, Y.-S. & Harbison, G. S. Isotopomeric Polymorphism. *J. Am. Chem. Soc.* 126, 8392-8393 (2004).

The invention claimed is:

1. A method for screening a target compound for polymorphic forms, the method comprising:
    providing a library of mixed-crystal seeds, each mixed-crystal seed consisting essentially of the target compound and at least one structural analog that is structurally analogous to the target compound; and
    for each mixed-crystal seed:
        introducing the mixed-crystal seed into a crystallization medium comprising the target compound, under conditions suitable for crystallization of the target compound;
        monitoring the formation of crystals of the target compound; and
        when formed, characterizing the crystals of the target compound.
2. The method of claim 1, wherein the library of mixed-crystal seeds is prepared by varying at least one of a chemical structure of the at least one structural analog and a molar ratio of the target compound and the at least one structural analog.
3. The method of claim 1, wherein each mixed-crystal seed comprises the target compound and the at least one structural analog in a molar ratio varying between 95:5 and 5:95.
4. The method of claim 3, wherein each mixed-crystal seed comprises the target compound and the at least one structural analog in a molar ratio between 75:25 and 25:75.
5. The method of claim 1, wherein each one of the at least one structural analog is one of an isostere of the target compound, an isomer of the target compound, a quasi-isostere of the target compound, an isomer of an isostere of the target compound, and an isomer of a quasi-isostere of the target compound.
6. The method of claim 5, wherein:
    the isomer of the target compound is a constitutional isomer of the target compound, an enantiomer of the target compound, a diastereoisomer of the target compound, or an isotopic isomer of the target compound;
    the isomer of the isostere of the target compound is a constitutional isomer of the isostere of the target compound, an enantiomer of the isostere of the target compound, a diastereoisomer of the isostere of the target compound, or an isotopic isomer of the isostere of the target compound; and
    the isomer of the quasi-isostere of the target compound is a constitutional isomer of the quasi-isostere of the target compound, an enantiomer of the quasi-isostere of the target compound, a diastereoisomer of the quasi-isostere of the target compound, or an isotopic isomer of the quasi-isostere of the target compound.
7. The method of claim 1, wherein the crystallization medium comprises one of a solution of the target compound in a solvent, a melt of the target compound, a solid, a mixture of solids and a mixture of a melt of the target compound suspended in a liquid.
8. The method of claim 7, wherein crystallization of the target compound is performed by at least one of grinding and sublimation.
9. The method of claim 1, wherein monitoring the formation of crystals of the target compound comprises monitoring the formation of single crystals of the target compound suitable for single-crystal X-ray diffraction.
10. The method of claim 1, wherein characterizing the crystals of the target compound is performed by at least one of powder X-ray diffraction (PXRD), single-crystal X-ray diffraction (SC-XRD), thermogravimetric analysis (TGA), differential scanning calorimetry (DSC), Raman spectroscopy, and infrared spectroscopy.
11. A method for crystallizing a target compound, the method comprising:
    providing a mixed-crystal seed consisting essentially of the target compound and at least one structural analog that is structurally analogous to the target compound; and
    introducing the mixed crystal seed into a crystallization medium comprising the target compound, to obtain crystals of the target compound.
12. The method of claim 11, wherein the mixed-crystal seed comprises the target compound and the at least one structural analog in a molar ratio varying between 95:5 and 5:95.
13. The method of claim 11, wherein each one of the at least one structural analog is one of an isostere of the target compound, an isomer of the target compound, a quasi-isostere of the target compound, an isomer of an isostere of the target compound, and an isomer of a quasi-isostere of the target compound.

14. The method of claim 13, wherein:
the isomer of the target compound is a constitutional isomer of the target compound, an enantiomer of the target compound, a diastereoisomer of the target compound, or an isotopic isomer of the target compound;
the isomer of the isostere of the target compound is a constitutional isomer of the isostere of the target compound, an enantiomer of the isostere of the target compound, a diastereoisomer of the isostere of the target compound, or an isotopic isomer of the isostere of the target compound; and
the isomer of the quasi-isostere of the target compound is a constitutional isomer of the quasi-isostere of the target compound, an enantiomer of the quasi-isostere of the target compound, a diastereoisomer of the quasi-isostere of the target compound, or an isotopic isomer of the quasi-isostere of the target compound.

15. The method of claim 11, wherein the crystallization medium comprises one of a solution of the target compound in a solvent, a melt of the target compound, a solid, a mixture of solids and a melt of the target compound suspended in a liquid.

16. The method of claim 15, wherein crystallization of the target compound is performed by at least one of grinding and sublimation.

17. The method of claim 11, further comprising monitoring the formation of single crystals of the target compound suitable for single-crystal X-ray diffraction.

18. The method of claim 15, further comprising characterizing the crystals of the target compound.

19. The method of claim 18, wherein characterizing the crystals of the target compound is performed by at least one of powder X-ray diffraction (PXRD), single-crystal X-ray diffraction (SC-XRD), thermogravimetric analysis (TGA), differential scanning calorimetry (DSC), Raman spectroscopy, and infrared spectroscopy.

20. The method of claim 1, wherein the target compound is in the form of a neutral molecule, a compound in the form of a salt of a neutral compound, a compound in the form of a solvate of a neutral compound or a salt, or a compound in the form of a cocrystal of a neutral compound or a salt.

* * * * *